(12) United States Patent
Jung

(10) Patent No.: US 8,266,840 B2
(45) Date of Patent: Sep. 18, 2012

(54) WATER STORAGE APPARATUS WITH STRUCTURE OF MULTIPLE LAYERS

(75) Inventor: Gi Sun Jung, Hanam-si (KR)

(73) Assignee: POSI Inc., Sungdong-Gu, Seoul (KR)

( * ) Notice: Subject to any disclaimer, the term of this patent is extended or adjusted under 35 U.S.C. 154(b) by 466 days.

(21) Appl. No.: 12/449,030

(22) PCT Filed: Dec. 18, 2007

(86) PCT No.: PCT/KR2007/006642
§ 371 (c)(1),
(2), (4) Date: Jul. 21, 2009

(87) PCT Pub. No.: WO2008/088133
PCT Pub. Date: Jul. 24, 2008

(65) Prior Publication Data
US 2010/0072102 A1    Mar. 25, 2010

(30) Foreign Application Priority Data

| Jan. 17, 2007 | (KR) | 10-2007-0005308 |
| May 23, 2007 | (KR) | 10-2007-0050552 |
| Dec. 12, 2007 | (KR) | 10-2007-0129359 |

(51) Int. Cl.
*A01G 25/00*    (2006.01)

(52) U.S. Cl. .......................................... 47/82
(58) Field of Classification Search ................ 47/82, 83, 47/85, 79, 65.5, 66.1, 66.3, 66.6
See application file for complete search history.

(56) References Cited

U.S. PATENT DOCUMENTS

| 5,251,399 | A * | 10/1993 | Rasmussen | 47/39 |
| 6,470,625 | B1 * | 10/2002 | Byun | 47/82 |
| 6,840,008 | B1 * | 1/2005 | Bullock et al. | 47/82 |
| 2005/0262768 | A1 * | 12/2005 | Cybula | 47/83 |
| 2007/0186469 | A1 * | 8/2007 | Keats | 47/83 |
| 2009/0038220 | A1 * | 2/2009 | Guthrie | 47/85 |

* cited by examiner

Primary Examiner — Monica Williams
(74) Attorney, Agent, or Firm — GWiPS

(57) ABSTRACT

A multi-story water storage apparatus includes a plurality of stackable units arranged one above another along a vertical axis. Each of the stackable units includes a coupling portion arranged in alignment with the vertical axis, the coupling portion having a first space with a drainage hole. At least one of the stackable units is a storage unit having a storage portion arranged radially outwardly of the coupling portion with respect to the vertical axis. The storage portion is provided with a water storage compartment. The storage unit has an outlet passage through which water stored in the storage compartment flows into the first space.

7 Claims, 42 Drawing Sheets

Fig. 27
(a)
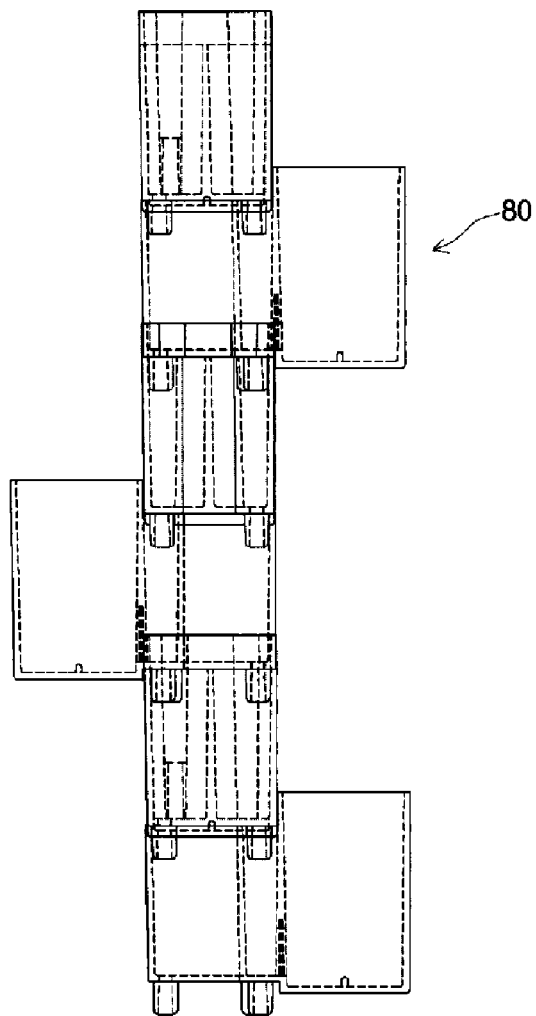
(b)
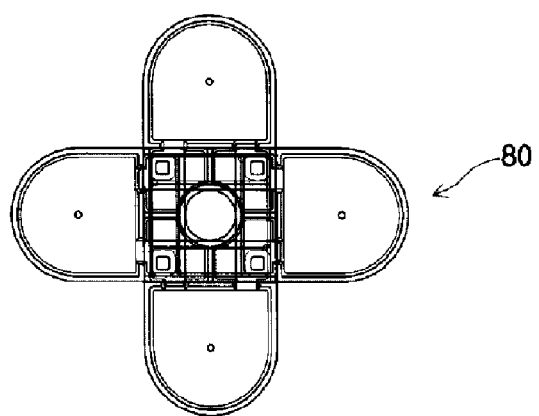

Fig. 29
(a)
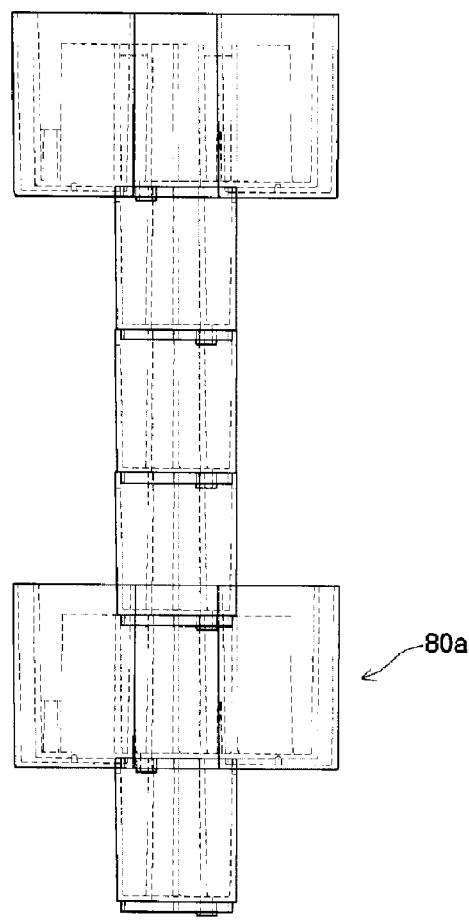
(b)
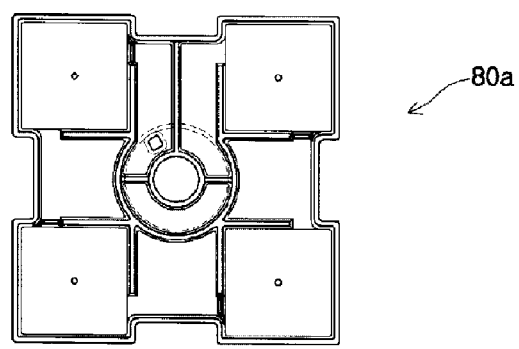

Fig. 33
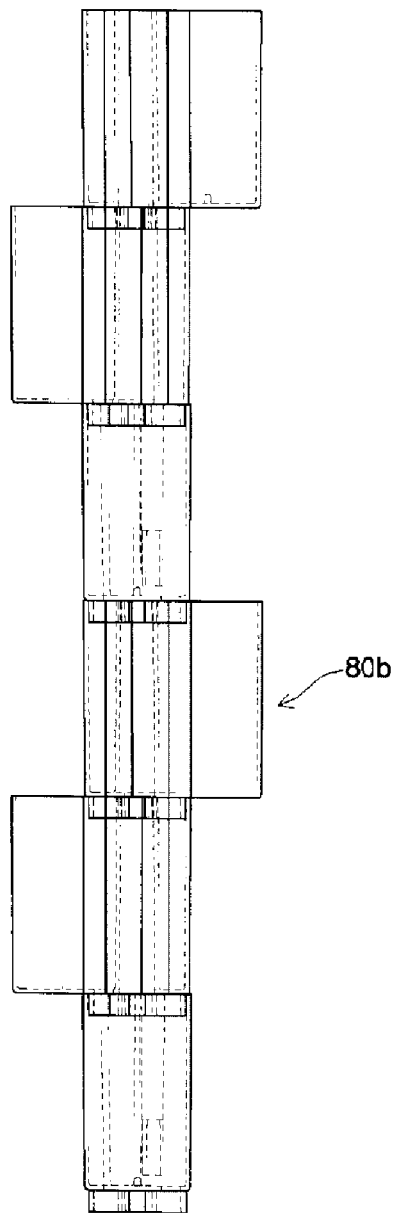
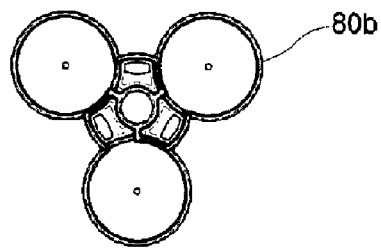

Fig. 34
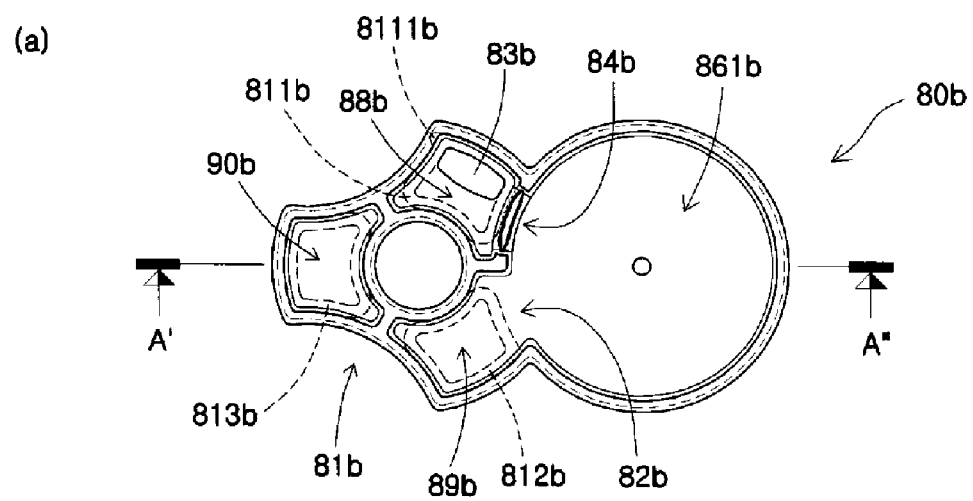
(a)
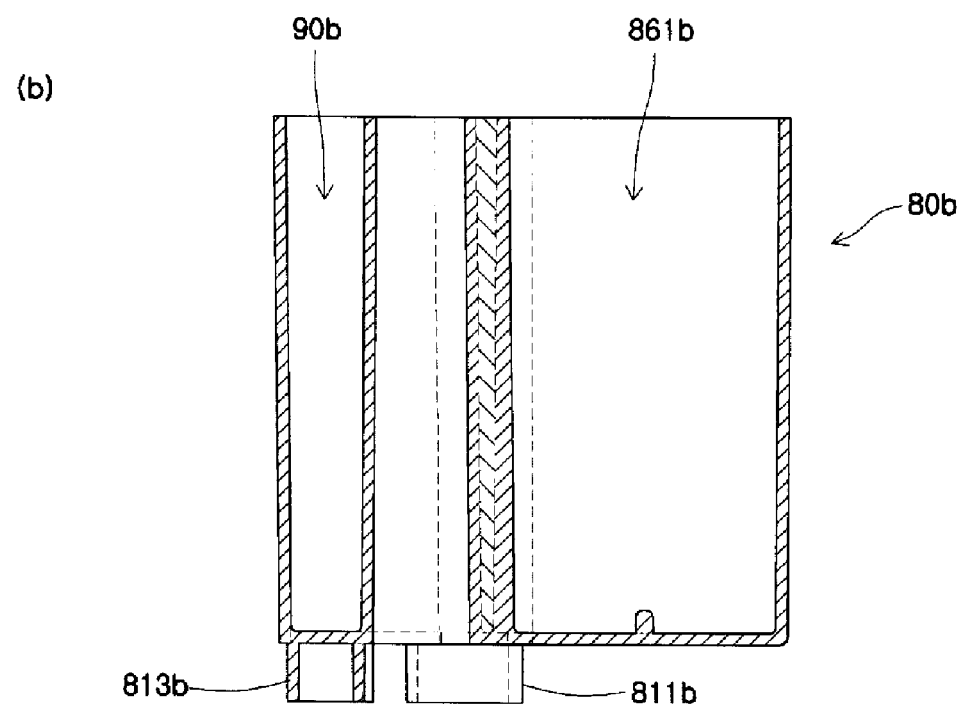
(b)

Fig. 35
(a)
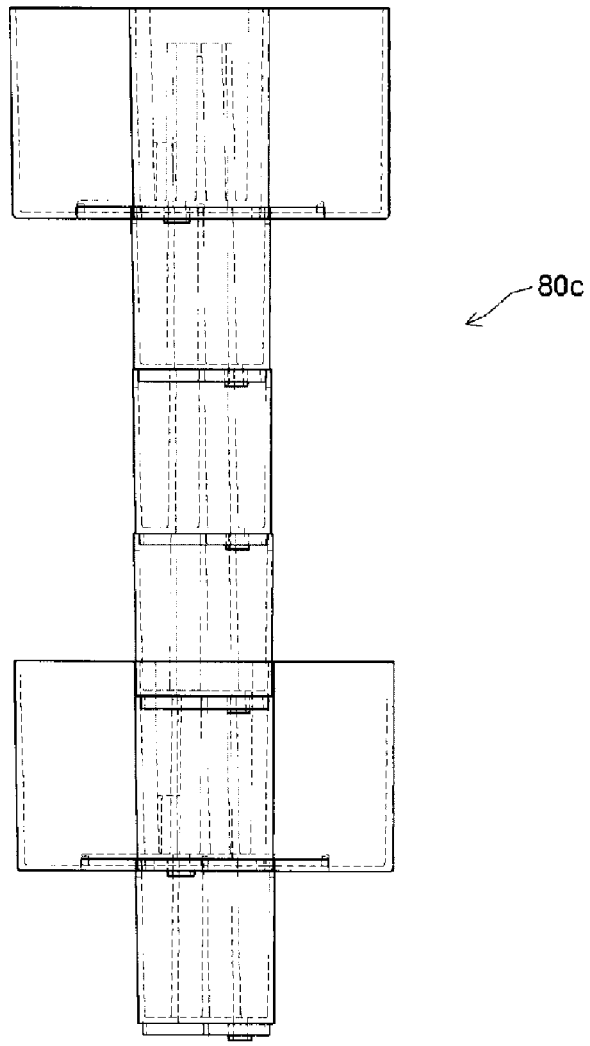
(b)
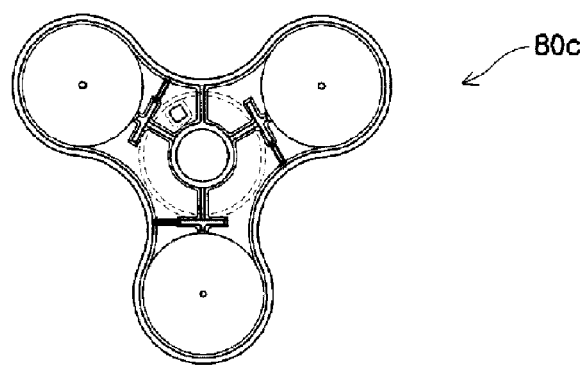

Fig. 36
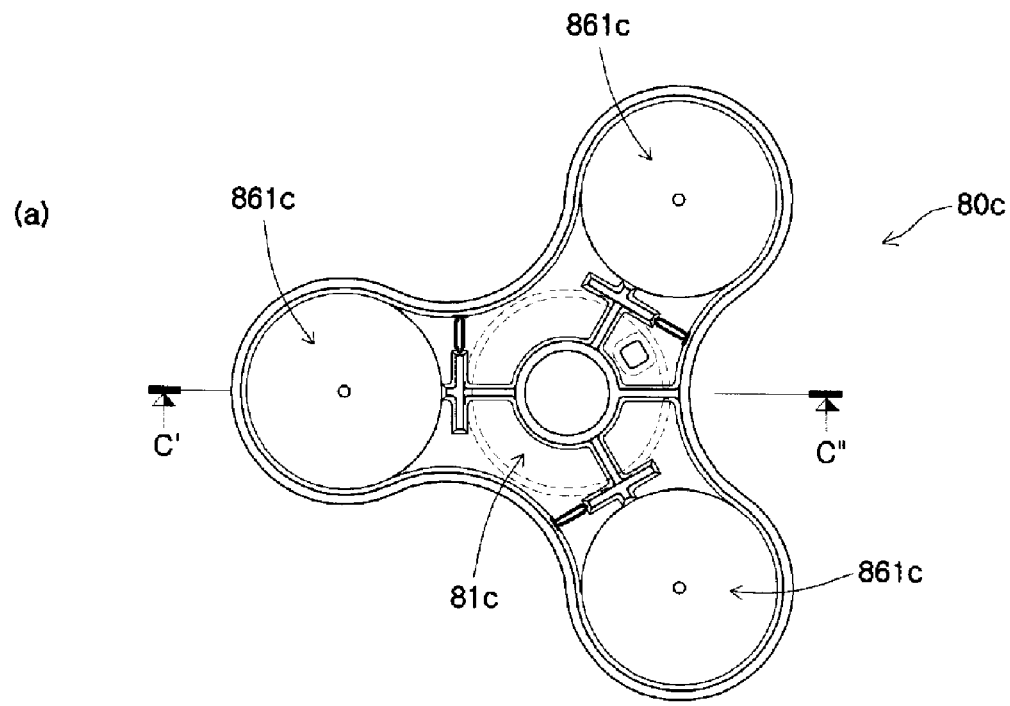
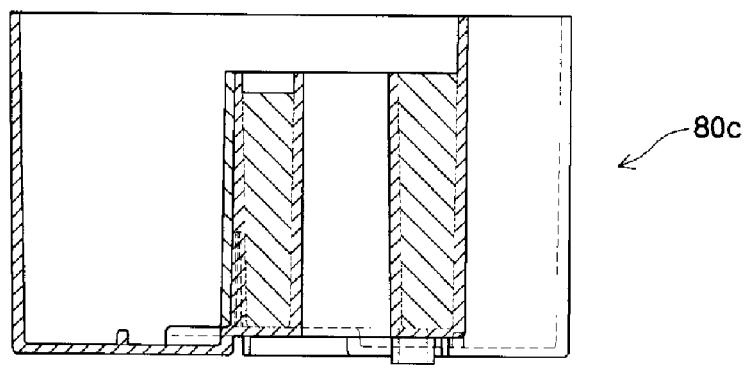

Fig. 38
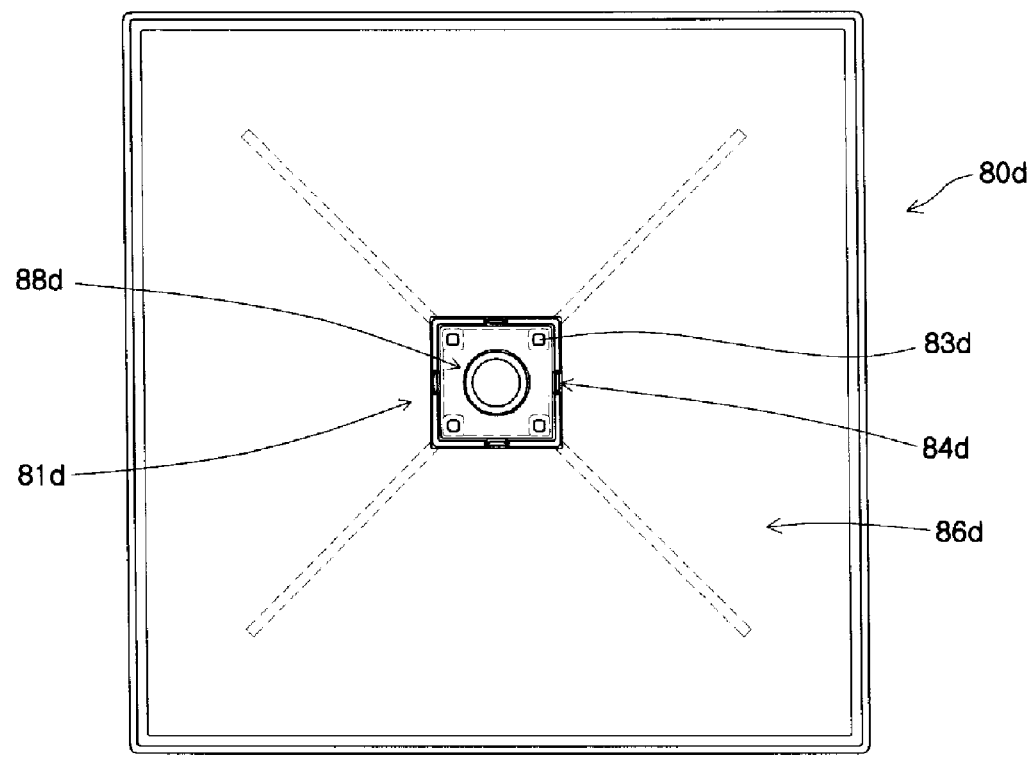
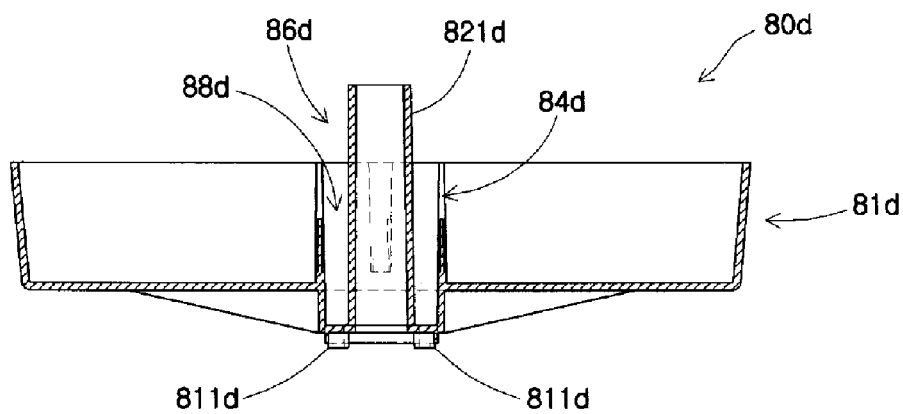

Fig. 40
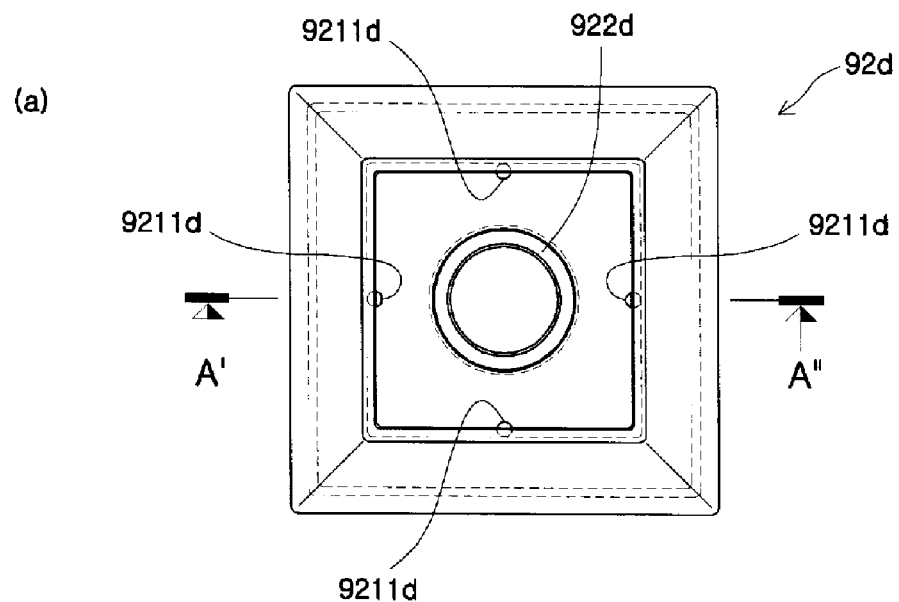
(a)
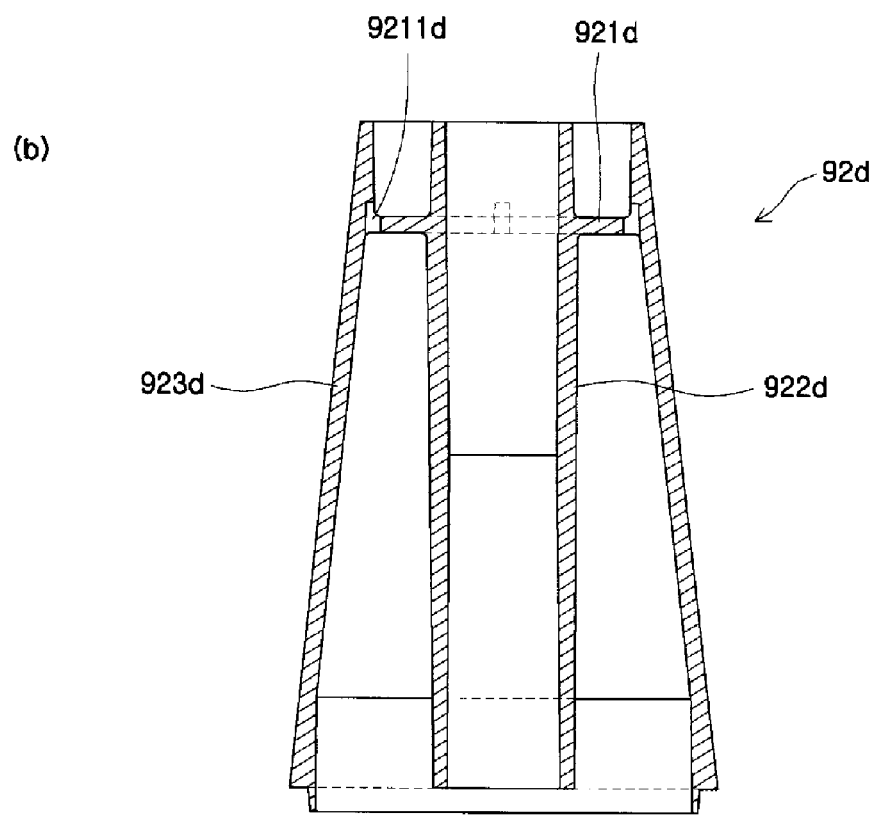
(b)

Fig. 41
(a)
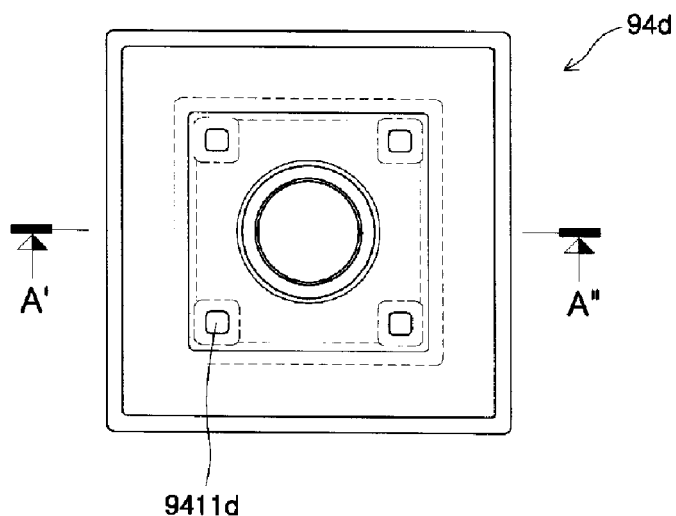
(b)
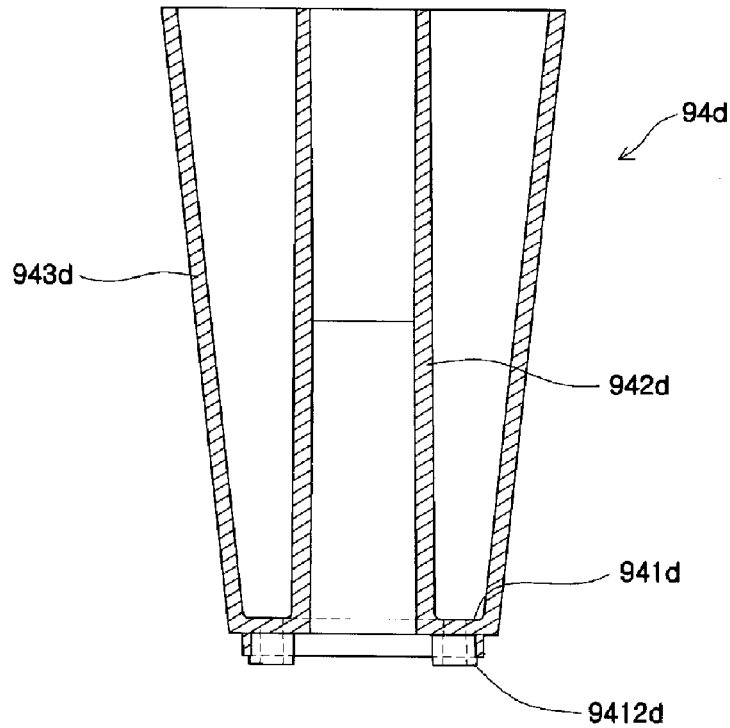

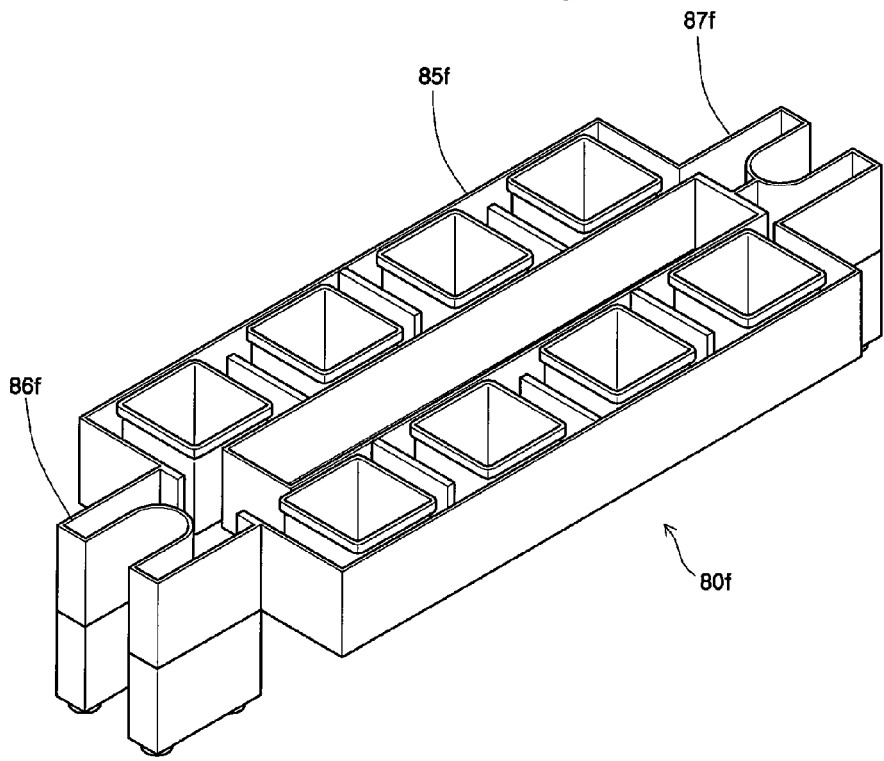
Fig. 46
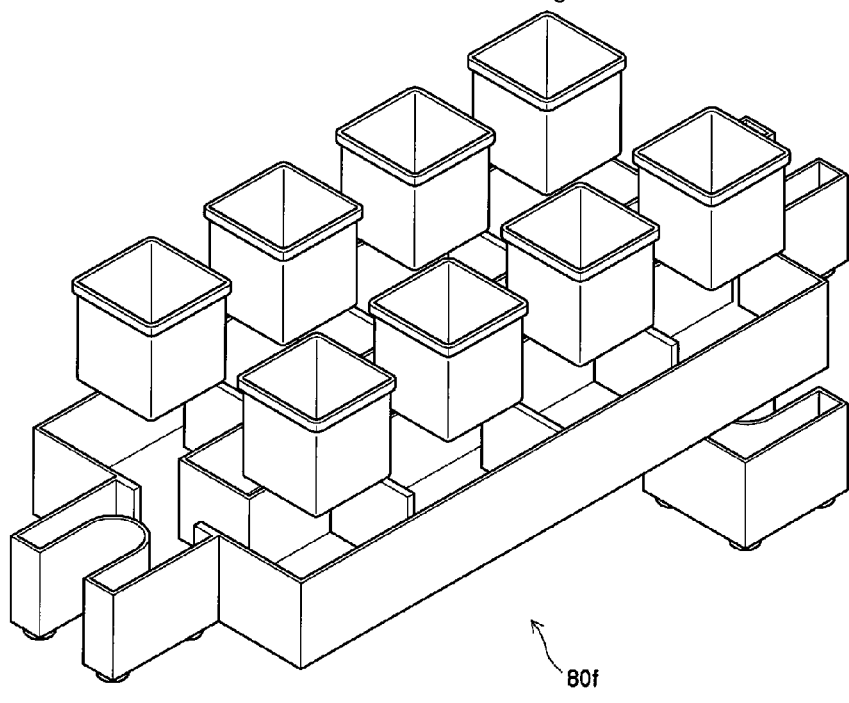
Fig. 47
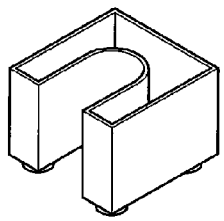

Fig. 51
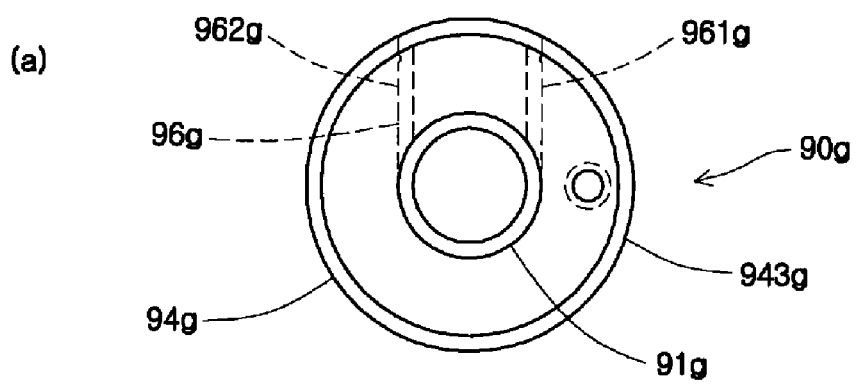
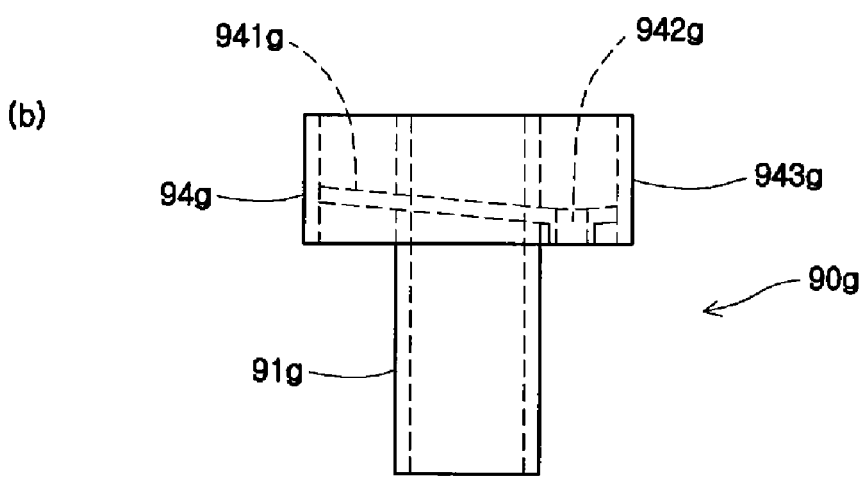
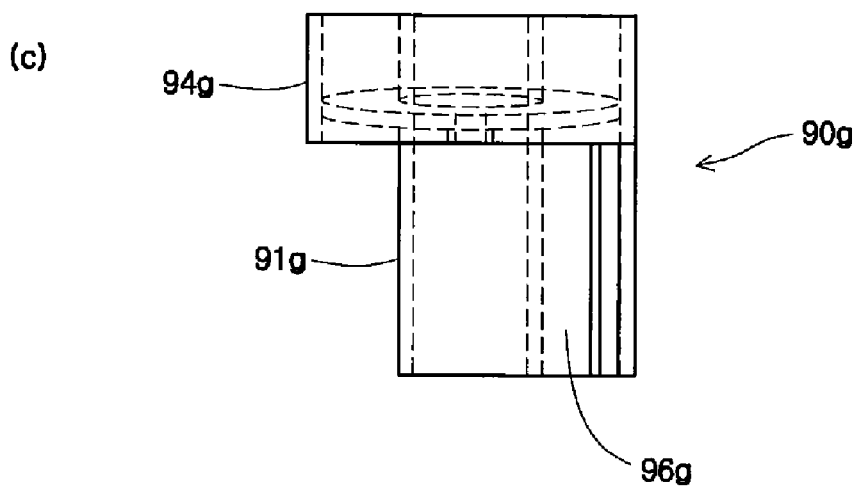

Fig. 54
(a)
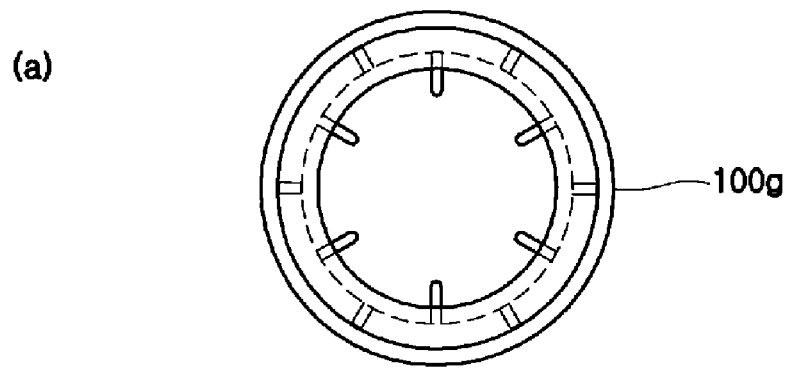
(b)
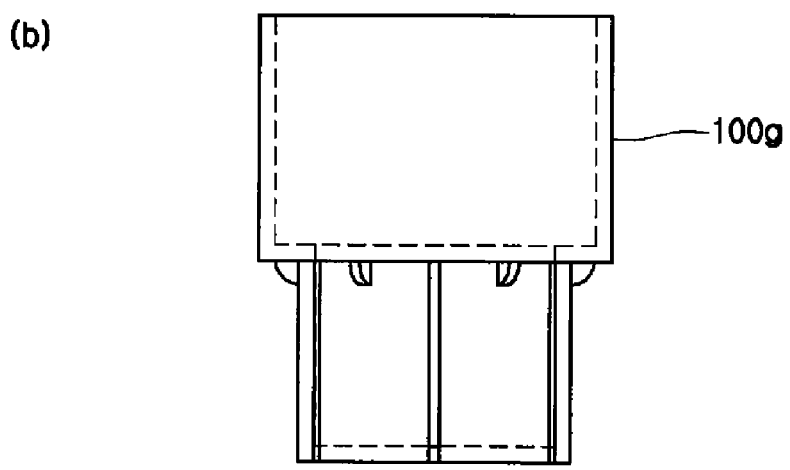
Fig. 55
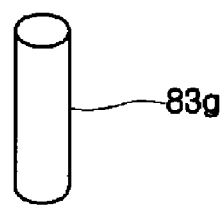

WATER STORAGE APPARATUS WITH STRUCTURE OF MULTIPLE LAYERS

BACKGROUND OF THE INVENTION

1. Field of the Invention

The present invention relates to a water storage apparatus and, more particularly, to a multi-story water storage apparatus that allows water to be supplied and drained with ease.

2. Related Prior Art

A conventional multi-story water storage apparatus for use in water culture includes a plurality of water storage parts arranged one above another to serve as cultivating bed portions and a water supply and drainage structure for supplying water to the topmost water storage part that the water can sequentially flow down to the water storage parts arranged below the topmost one. The water supply and drainage structure employed in the water storage apparatus is designed to merely interconnect the upper water storage parts and the lower water storage parts. For this reason, if the number of water storage parts is increased, the task of interconnecting the water storage parts one by one becomes quite onerous. Furthermore, the conventional water storage apparatus is highly restrictive in its external appearance.

SUMMARY OF THE INVENTION

It is an object of the present invention to provide a multi-story water storage apparatus that has a simplified structure.

Another object of the present invention is to provide a multi-story water storage apparatus having a simplified water supply and drainage structure.

A further object of the present invention is to provide a multi-story water storage apparatus that can be easily installed in place.

A still further object of the present invention is to provide a multi-story water storage apparatus having a variety of shapes.

A yet still further object of the present invention is to provide a multi-story water storage apparatus that performs a plant cultivating function and greatly assists in stabilizing a water quality and purifying an air.

A yet still further object of the present invention is to provide a storage unit for use in a multi-story water storage apparatus that can be easily installed in place.

A yet still further object of the present invention is to provide a storage unit for use in a multi-story water storage apparatus that allows water to be supplied and drained with ease.

A yet still further object of the present invention is to provide a storage unit for use in a multi-story water storage apparatus that makes it possible to control a water level with ease.

In one aspect of the present invention, there is provided a multi-story water storage apparatus, comprising:

a plurality of stackable units arranged one above another along a vertical axis, each of the stackable units including a coupling portion arranged in alignment with the vertical axis, the coupling portion having a first space with a drainage hole, at least one of the stackable units being a storage unit having a storage portion arranged radially outwardly of the coupling portion with respect to the vertical axis, the storage portion having a water storage compartment, the storage unit having an outlet passage through which water stored in the storage compartment flows into the first space.

The coupling portion of the storage unit may have a second space isolated from the first space, the storage unit having an inlet passage through which the water is introduced from the second space into the storage compartment, the second space of the coupling portion adapted to receive the water from an external water source.

The storage compartment may include at least two individual storage regions arranged circumferentially with respect to the vertical axis, the individual storage regions communicating with one another through a communication passage so that the water can be introduced from one of the individual storage regions into another, whereby the water can flow within the storage compartment to turn around the vertical axis.

The storage compartment of the storage unit may lie on one side of the coupling portion and the storage unit may include at least two storage units whose storage compartments are staggered to left and right sides along a vertical direction.

The storage compartment of the storage unit may lie on one side of the coupling portion and the storage unit may include at least three storage units whose storage compartments are arranged spirally along a vertical direction.

The each of the stackable units may further include a water supply unit arranged above the storage unit for supplying the water to the storage compartment of the storage unit.

The water supply unit may be provided with a peripheral wall having a flared skirt portion inclined downwardly and outwardly, the water supply unit having a drainage hole communicating with an outer surface of the peripheral wall.

The multi-story water storage apparatus may further comprise a column extending along the vertical axis, the coupling portion of each of the stackable units having a tubular section into which the column is inserted.

The multi-story water storage apparatus may further comprise a stand for supporting the column, the stand having an internal space for storing the water drained from a lowermost one of the stackable units.

The multi-story water storage apparatus may further comprise a pump for upwardly feeding the water stored in the internal space of the stand to supply the water to one of the stackable units.

The pump may be adapted to supply the water to an uppermost one of the stackable units.

The multi-story water storage apparatus may further comprise a water feeding pipe received within the column to extend in a vertical direction, the pump adapted to upwardly feed the water through the water feeding pipe.

The multi-story water storage apparatus may further comprise an illuminating device installed in the column.

In the multi-story water storage apparatus, an electric wire may be connected to the illuminating device and received within the column.

The multi-story water storage apparatus may further comprise a hollow cylinder-shaped plant cultivating kit removably installed in the storage compartment.

The cultivating kit may include a plurality of ring members arranged one above another and a plurality of connecting members extending in a vertical direction to interconnect the ring members.

The storage unit may include an additional coupling portion having a second space into which the water is introduced from above the additional coupling portion, the storage portion designed to extend between the coupling portion and the additional coupling portion.

The storage unit may include an additional coupling portion, the storage portion designed to extend between the coupling portion and the additional coupling portion, the water storage compartment formed of two parallel compartment rows joined to each other so that the water can flow through the two compartment rows, the storage portion provided with a wall for dividing the two compartment rows.

The storage portion may include dividing walls provided within the water storage compartment in such a manner that the water can flow in zigzag.

The multi-story water storage apparatus may further comprise a plurality of body units, each of the body units including a column portion, a guide portion extending along the column portion and a reception portion having a water drainage hole, each of the stackable units having an insertion hole fitted to the guide portion of each of the body units.

In the multi-story water storage apparatus, a photocatalytic material may be coated on wall surfaces extending along a route through which the water flows.

The photocatalytic material may be made of a TiON mixture. The TiON mixture may contain nano silver particles and nano platinum particles.

In another aspect of the present invention, there is provided a storage unit, comprising:

a coupling portion provided with a first space having a drainage hole; and a storage portion arranged laterally outwardly of the coupling portion, the storage portion having a water storage compartment, wherein the storage unit has an outlet passage through which water stored in the storage compartment is drained to the first space of the coupling portion.

The storage compartment may include at least two individual storage regions arranged circumferentially around the coupling portion, the individual storage regions communicating with one another through a communication passage so that the water can be introduced from one of the individual storage regions into another.

The coupling portion may have a second space isolated from the first space and the storage unit may have an inlet passage through which the water is introduced from the second space into the storage compartment.

The coupling portion may include a bottom having a drainage hole, a side wall extending upwardly from the bottom and a partition wall for dividing the coupling portion into the first space and the second space. The partition wall may extend upwardly from the bottom.

The partition wall may be off-centered to make the first space smaller than the second space, the drainage hole formed on the bottom of the coupling portion within the first space in alignment with a center portion of the partition wall. The bottom of the coupling portion may be of a generally square shape.

The coupling portion may be further provided with a tubular section having a central passageway, the tubular section formed offset toward the second space from the partition wall. The passageway of the tubular section may have a rectangular cross-sectional shape.

The partition wall may extend generally in a horizontal direction to have the first space and the second space arranged one below the other. The storage portion and the coupling portion may be of a cylindrical shape.

The coupling portion may be further provided with a tubular section having a central passageway. The passageway of the tubular section may have a circular cross-sectional shape.

The coupling portion may be further provided with a tubular section having a central passageway, the tubular section opened at one end. In the storage unit, protrusion portions may be formed on the bottom of the coupling portion.

In the storage unit, protrusion portions may be formed on the bottom of the coupling portion and the coupling portion may be further provided with a cover covering the first space and the second space.

In the storage unit, at least three protrusion portions may be formed on the bottom of the coupling portion. At least one of the protrusion portions may have a raised portion extending laterally outwardly.

The outlet passage may be height-adjustable by means of a removable water level control member.

In the storage unit, protrusion portions may be formed on the bottom of the coupling portion in such a manner as to extend downwardly and the side wall of the coupling portion may have a pair of end wall portions inclined at a predetermined angle toward an opened end of the tubular section. The predetermined angle may be 60 degrees.

With the configurations of the present invention, it is possible to achieve all the objects of the present invention set forth above. More specifically, it becomes possible to supply and drain water merely by fitting a plurality of storage units and connector units to a column, meaning that the water storage apparatus can be very easily installed in place. The storage units can be arranged in many different shapes, including a spiral shape, which provides an improved decoration effect. Use of photocatalytic beads is particularly effective in stabilizing a water quality and purifying an air. Employment of the structure assuring easy supply and drainage of water makes it possible to readily enjoy floriculture even within a sunless space such as a basement or a closed office. Moreover, the sterilizing action exercised by a photocatalytic material accelerates the growth of a plant.

BRIEF DESCRIPTION OF THE DRAWINGS

FIGS. 27(a) and 27(b) are side and top plan views showing some parts of a plant cultivation apparatus in accordance with a yet still further embodiment of the present invention.

FIGS. 29(a) and 29(b) are side and top plan views showing some parts of a plant cultivation apparatus in accordance with a yet still further embodiment of the present invention.

FIGS. 33(a) and 33(b) are side and top plan views showing some parts of a plant cultivation apparatus in accordance with a yet still further embodiment of the present invention.

FIG. 34(a) is a top plan view illustrating a flowerpot unit of the plant cultivation apparatus shown in FIG. 33 and FIG. 34(b) is a side elevational section view thereof.

FIGS. 35(a) and 35(b) are side and top plan views showing some parts of a plant cultivation apparatus in accordance with a yet still further embodiment of the present invention.

FIG. 36(a) is a top plan view illustrating a flowerpot unit of the plant cultivation apparatus shown in FIG. 35 and FIG. 36(b) is a side elevational section view thereof.

FIG. 38(a) is a top plan view illustrating a flowerpot unit of the plant cultivation apparatus shown in FIG. 37 and FIG. 38(b) is a side elevational section view thereof.

FIG. 40(a) is a top plan view illustrating a top connector unit of the plant cultivation apparatus shown in FIG. 37 and FIG. 40(b) is a side elevational section view thereof.

FIG. 41(a) is a top plan view illustrating a bottom connector unit of the plant cultivation apparatus shown in FIG. 37 and FIG. 41(b) is a side elevational section view thereof.

FIG. 46 is a perspective view showing some parts of a plant cultivation apparatus in accordance with a yet still further embodiment of the present invention.

FIG. 47 is an exploded perspective view of the plant cultivation apparatus shown in FIG. 46.

FIGS. 51(a), 51(b) and 51(c) are views illustrating a body unit employed in the plant cultivation apparatus shown in FIG. 50.

FIGS. 54(a) and 54(b) are views illustrating a cultivating unit employed in the plant cultivation apparatus shown in FIG. 50.

FIG. 55 is a perspective view illustrating a water level control member of the flowerpot unit shown in FIG. 52.

DETAILED DESCRIPTION OF THE PREFERRED EMBODIMENTS

Hereinafter, various embodiments of the present invention will be described in detail with reference to the accompanying drawing.

Figure 1:
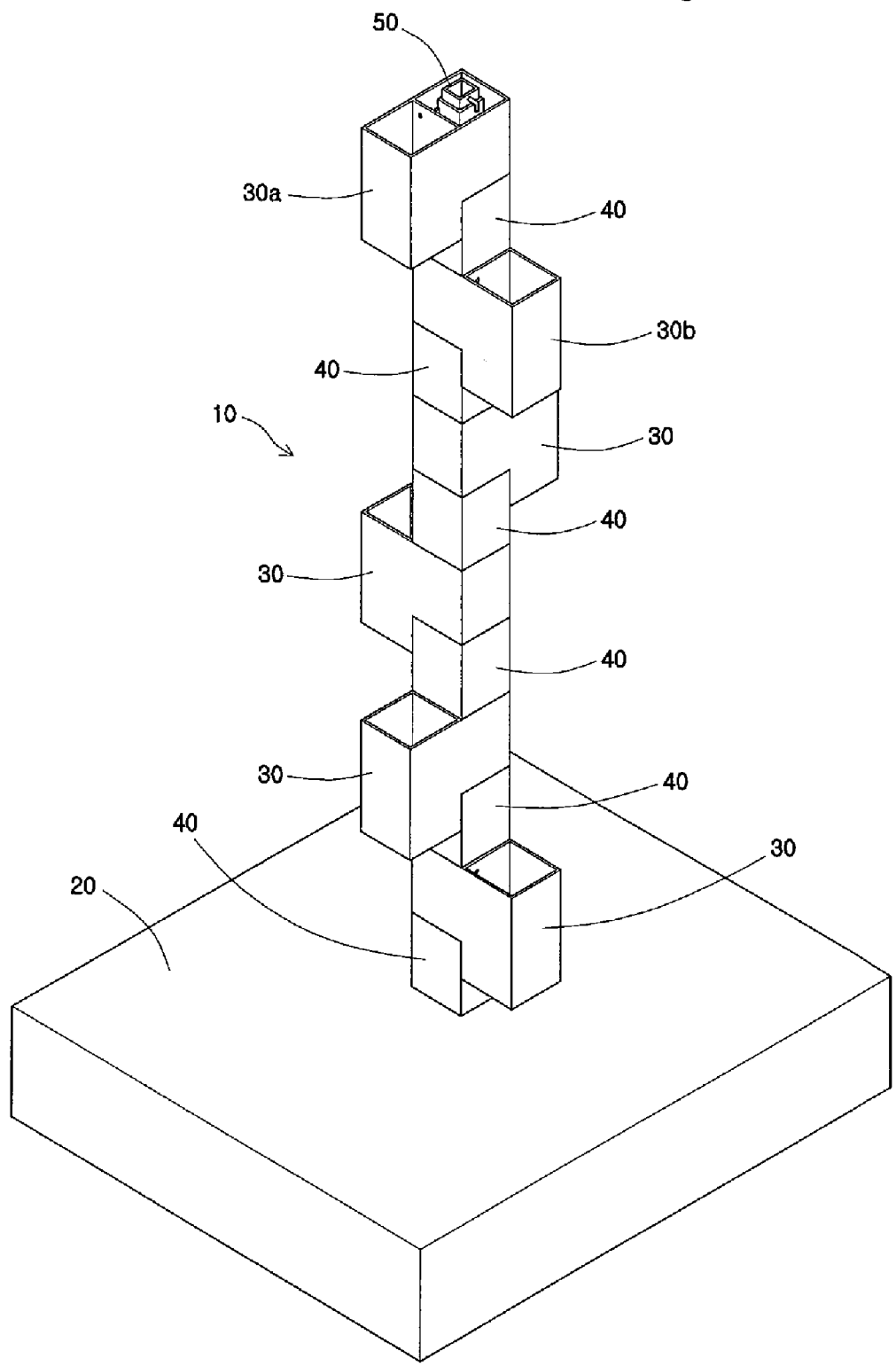
FIG. 1 is a perspective view showing a plant cultivation apparatus as a multi-story water storage apparatus in accordance with one embodiment of the present invention.
Figure 2:
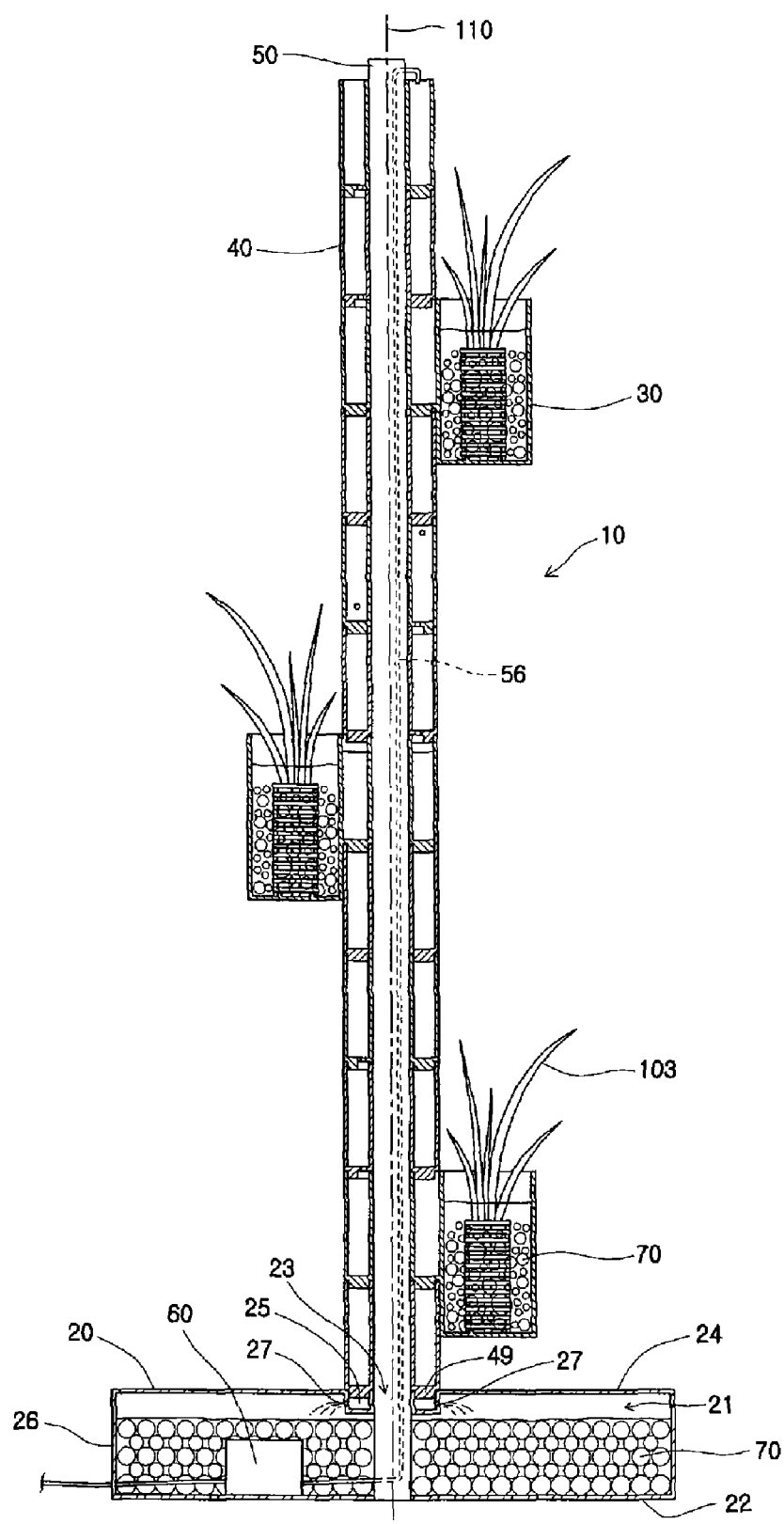
FIG. 2 is a section view of the plant cultivation apparatus shown in FIG. 1.
Figure 3:
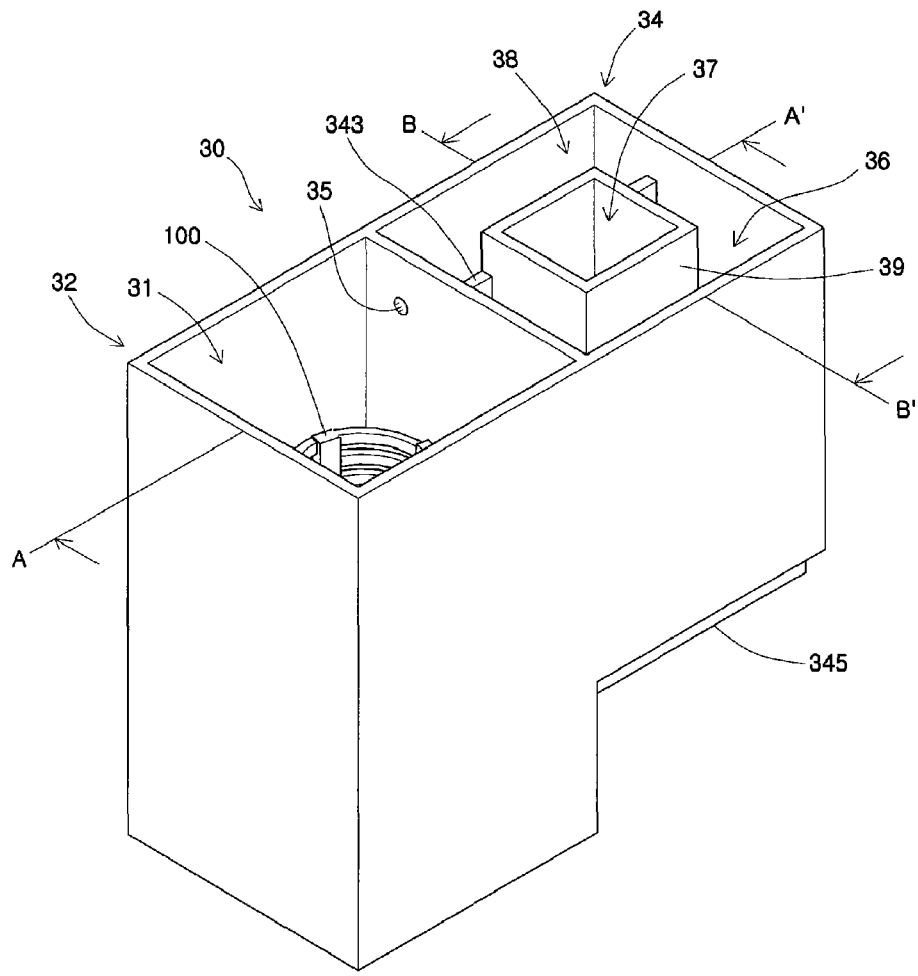
FIG. 3 is a perspective view illustrating a flowerpot unit of the plant cultivation apparatus shown in FIG. 1.
Figure 4:
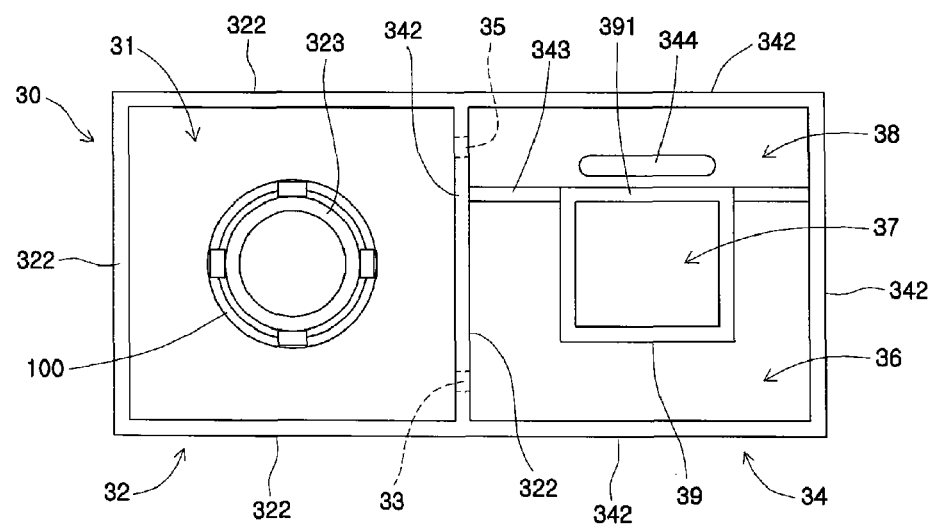
FIG. 4 is a top plan view illustrating the flowerpot unit illustrated in FIG. 3.
Figure 5:
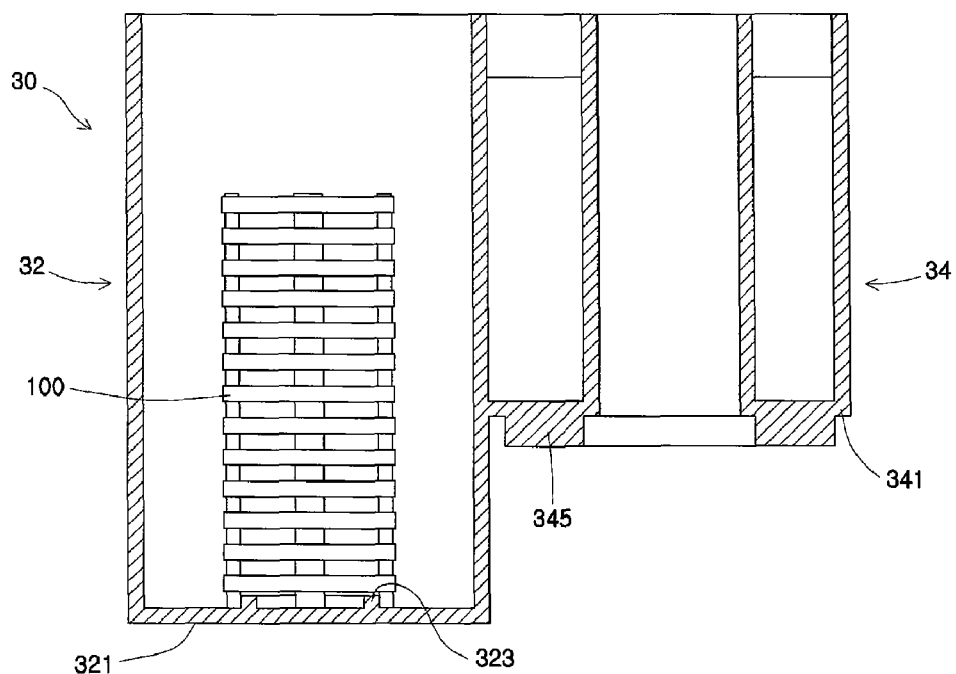
FIG. 5 is a section view of the flowerpot unit taken along line A-A' in FIG. 3.
Figure 6:
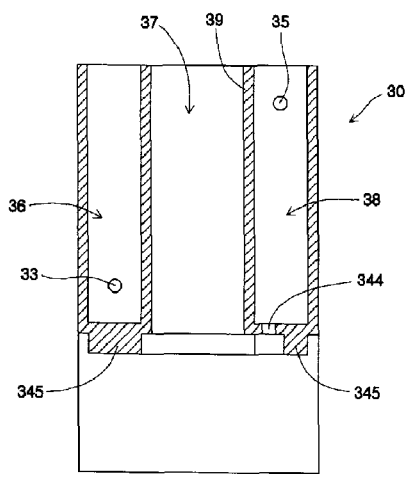
FIG. 6 is a section view of the flowerpot unit taken along line B-B' in FIG. 3.

Referring to FIGS. 1 and 2, a water storage apparatus 10 is designed for use in cultivating a plant and includes a stand 20, a column 50 extending upwardly from the stand 20 along a center axis 110, and a plurality of stackable units 30 and 40 fitted to the column 50 one above another. Each of the stackable units 30 and 40 includes a plurality of storage units 30 serving as flowerpot units and a plurality of connector units 40. In the following description, the storage units 30 will be referred to as "flowerpot units" in terms of their function.

The stand 20 includes a bottom plate 22, a top plate 24 spaced apart from the bottom plate 22 and a side wall 26 that interconnects the bottom plate 22 and the top plate 24. At the center of the top plate 24, there is formed a through-hole 23 into which the column 50 is snugly inserted and fixed to the bottom plate 22. The through-hole 23 has a rectangular shape conforming to the cross-sectional shape of the column 50. A reception groove 25 is formed around the through-hole 23 to surround the latter. The reception groove 25 communicates with an internal space 21 of the stand 20 through communication passages 27. Inserted into the reception groove 25 is a coupling portion of the bottommost one of the connector units 40.

A water pump 60 is mounted within the internal space 21 of the stand 20. The water pump 60 serves to feed water stored within the internal space 21 in an upward direction through a water feeding pipe 56. In addition to the water, photocatalytic beads 70 are stored within the internal space 21 of the stand 20. The photocatalytic beads 70 are glass beads coated with a mixture of visible light photocatalyst, nano silver particles and nano platinum particles. Using light as energy, the visible light photocatalyst generates electron-hole pairs which in turn produce hydroxyl radicals, one of strong oxidizing agents, and negative oxygen ions, thereby oxidizing and decomposing various kinds of organic materials, moss and the like. The nano silver particles exhibit an antimicrobial action. In the present embodiment, titanium oxynitride (TiON) is used as the visible light photocatalyst. The photocatalytic beads 70 have the functions of air purification, sterilization, deodorization, water purification and pollution-proof and provide a visual decoration effect. Therefore, use of the photocatalytic beads 70 is very effective in making a good display and assists in accelerating the growth of a plant. The visible light photocatalyst is coated on the water-flowing wall surfaces of the stackable units 30 and 40 and the column 50, as well as the photocatalytic beads 70.

The column 50 is of a square pillar shape extending upwardly a long distance from the stand 20 along the center axis 110. The column 50 is fixed at its lower end to the bottom plate 22 of the stand 20. The column 50 is formed into a hollow shape so that the water feeding pipe 56 and electric wires (not shown) can pass through an internal passage thereof.

The flowerpot units 30 and the connector units 40 constituting the stackable units of the present invention are alternately arranged in a vertical direction of the column 50. Referring to FIGS. 3 through 6, each of the flowerpot unit 30 is provided with a cultivating bed portion (storage portion) 32 having a cultivating compartment 31 as a water storage compartment and a coupling portion 34 coupled to the connector unit 40 (see FIG. 2). The cultivating bed portion 32 has a square-shaped bottom plate 321 and four side walls 322 extending upwardly from the bottom plate 321. A circular protrusion 323 is formed on the bottom plate 321 so that a cultivating kit 100 can be can be removably fitted thereto.

Figure 9:
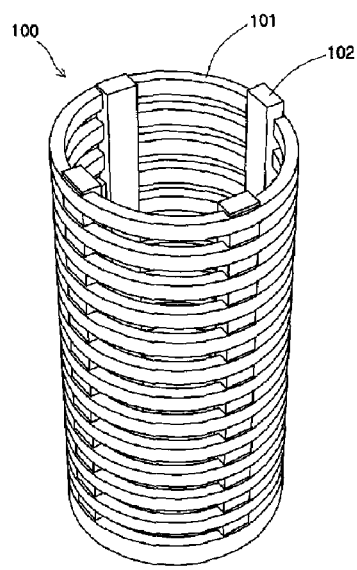
FIG. 9 is a perspective view illustrating a cultivating kit received in the flowerpot unit as illustrated in FIG. 2.

Referring to FIG. 9, the cultivating kit 100 is of a generally cylindrical shape and has a plurality of ring members 101 arranged one above another and a plurality of connecting members 102 extending in a vertical direction to interconnect the ring members 101. A plant 103 to be cultivated (see FIG. 2) is received in the cultivating kit 100 and pieces of quartz porphyry and/or hydro balls (clay balls) are filled in the cultivating kit 100 to fix the plant in place. The outer portion of the cultivating kit 100 in the cultivating compartment 31 is filled with the photocatalytic beads 70. An inlet passage 33 and an outlet passage 35 are formed in one of the side walls 322 in a spaced-apart relationship with each other. The level of water in the cultivating compartment 31 varies with the vertical position of the outlet passage 35. The inlet passage 33 communicates with a second space 36 of the coupling portion 34, while the outlet passage 35 communicates with a first space 38 of the coupling portion 34.

The coupling portion 34 is contiguous to the side wall 322 in which the inlet passage 33 and the outlet passage 35 are formed. The coupling portion 34 consists of a square-shaped bottom plate 341, four side walls 342 extending upwardly from the bottom plate 341, a column-receiving tubular section 39 vertically extending from the center of the bottom plate 341 and having a square passageway 37 opened at opposite ends, and a partition wall 343 dividing the internal space of the coupling portion 34 into the first and second spaces 38 and 36. The bottom plate 341 makes a right angle with the side wall 322 of the cultivating bed portion 32 contiguous to the coupling portion 34. A drainage hole 344 is formed in the portion of the bottom plate 341 corresponding to the first space 38 and is arranged immediately at the side of the column-receiving tubular section 39. The bottom plate 341 is provided at its lower end with a protrusion portion 345 that defines an extension of the passageway 37 communicating with the drainage hole 344. The protrusion portion 345 is formed into a shape that can be coupled to the top of the connector unit 40 or the top of the coupling portion 34 of the flowerpot unit 30 arranged just below the protrusion portion 345. One of the four side walls 342 of the coupling portion 34 is common to the side wall 322 of the cultivating bed portion 32 in which the inlet passage 33 and the outlet passage 35 are formed. Two of the four side walls 342 of the coupling portion 34 extend from the corresponding side walls 322 of the cultivating bed portion 32. The column 50 is inserted into the square passageway 37 of the column-receiving tubular section 39. The partition wall 343 that divides the internal space into the first and second spaces 38 and 36 is perpendicular to the side wall 322 of the cultivating bed portion 32 in which the inlet passage 33 and the outlet passage 35 are formed. The partition wall 343 forms a side wall 391 of the column-receiving tubular section 39. The top end of the partition wall 343 is lower than the top end of the column-receiving tubular section 39 and the top ends of the four side walls 342 of the coupling portion 34. This is to provide a space for receiving the protrusion portion 345 of the connector unit 40 or the coupling portion 34 of the flowerpot unit 30 arranged just above the partition wall 343. The flowerpot unit 30 may be used as a flower pot for cultivating a cut plant or for cultivating a plant in soil, as well as for hydroponics.

Figure 7:
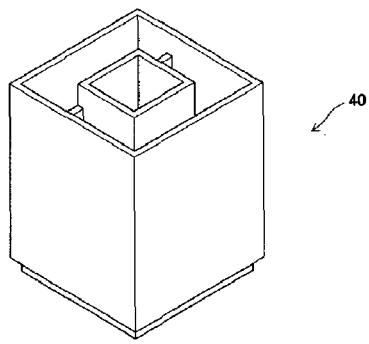
FIG. 7 is a perspective view illustrating a connector unit of the plant cultivation apparatus shown in FIG. 1.
Figure 8:
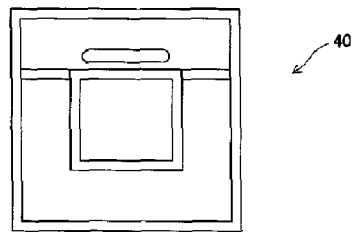
FIG. 8 is a top plan view illustrating the connector unit illustrated in FIG. 7.

Referring to FIGS. 7 and 8, it will be appreciated that the connector unit 40 has the same configuration as that of coupling portion 34 of the flowerpot unit 30. Therefore, no description will be made on the configuration of the connector unit 40. The connector unit 40 is coupled to the coupling portion 34 of the flowerpot unit 30 and serves to prolong the length of the coupling portion 34. In other words, the connector unit 40 may be regarded as an extension part of the coupling portion 34 of the flowerpot unit 30. Briefly, the connector unit 40 plays a role of interconnecting two flowerpot units 30 in a vertically spaced-apart relationship.

Figure 10:
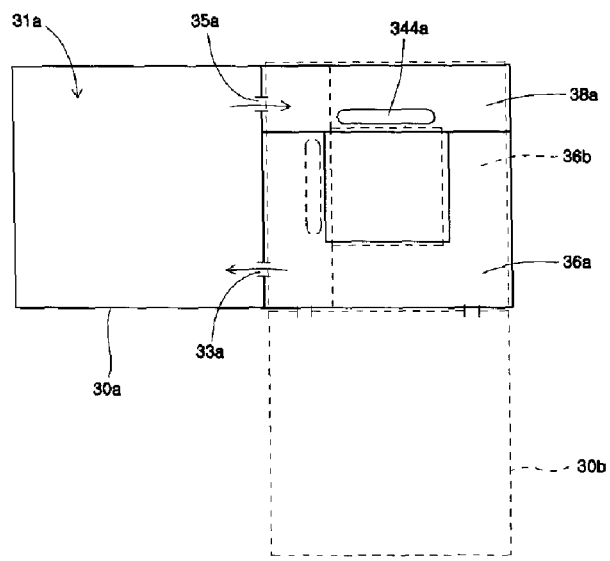
FIG. 10 is a top plan view illustrating a positional relationship between two neighboring flowerpot units of the plant cultivation apparatus shown in FIG. 1.
Figure 11:
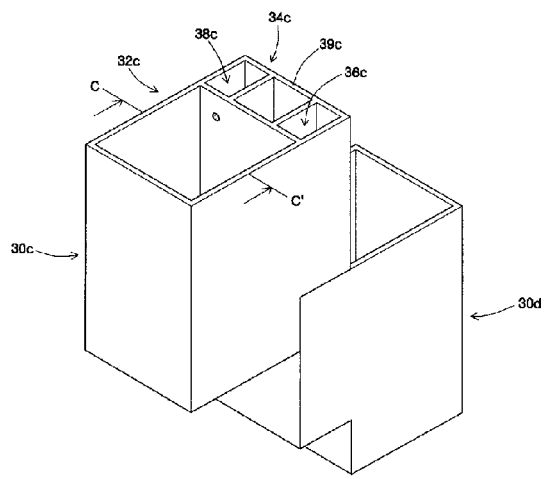
FIG. 11 is a perspective view showing another example of the flowerpot unit of the plant cultivation apparatus shown in FIG. 1, in which view two adjoining flowerpot units are shown together.
Figure 12:
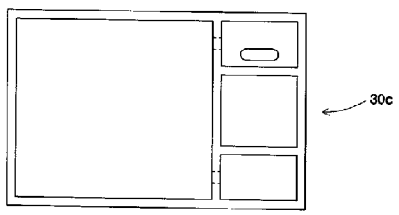
FIG. 12 is a top plan view of the flowerpot unit shown in FIG. 11.
Figure 13:
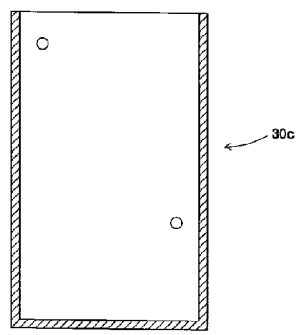
FIG. 13 is a section view of the flowerpot unit taken along line C-C' in FIG. 11.

The plurality of flowerpot units 30 are fitted to the column 50 in such a fashion that the cultivating bed portions 32 of the respective flowerpot units 30 can be spirally arranged with an angular difference of 90 degrees relative to one another. Schematically illustrated in FIG. 10 is a positional relationship between two adjoining flowerpot units 30. Referring to FIG. 10, the upper flowerpot unit 30a is indicated by solid lines and the lower flowerpot unit 30b is indicated by broken lines. The first space 38a of the upper flowerpot unit 30a communicates with the second space 36b of the lower flowerpot unit 30b through the drainage hole 344a of the upper flowerpot unit 30a.

Next, the operation of the plant cultivation apparatus as configured above will be described in detail with reference to FIGS. 1, 2 and 10.

Water stored in the internal space 21 of the stand 20 is fed upwardly by the water pump 60 through the water feeding pipe 56 installed within the column 50. The water thus fed is supplied to the second space 36a of the topmost flowerpot unit 30a to fill in the second space 36a. Then, the water in the second space 36a is supplied to the cultivating compartment 31a through the inlet passage 33a, whereby the cultivating compartment 31a is filled with water. The water level in the cultivating compartment 31a is decided by the vertical position of the outlet passage 35a. The water in the cultivating compartment 31a is supplied to the first space 38a through the outlet passage 35a and then drained to the connector unit 40 through the drainage hole 344a formed in the bottom of the first space 38a. The water flowing into the connector unit 40 is supplied to the second space 36b of the flowerpot unit 30b arranged just below the connector unit 40. By repeating the process set forth above, the water reaches the bottommost connector unit 40 and consequently returns to the internal space 21 of the stand 20. In this process, the water is supplied to all the cultivating compartments 31 of the flowerpot units 30 and is circulated continuously. During circulation of the water, the photocatalytic beads 70 filled in the stand 20 perform the functions of air purification, sterilization, deodorization, water purification and pollution-proof and provide a visual decoration effect. Therefore, use of the photocatalytic beads 70 is very effective in making a good display and assists in accelerating the growth of a plant.

Although each of the flowerpot units has a single cultivating bed portion in the embodiment described above, the present invention is not limited thereto. Instead, each of the flowerpot units may be provided with a plurality of cultivating bed portions.

Furthermore, although the connector unit is interposed between two neighboring flowerpot units in the embodiment described above, the present invention is not limited thereto. Instead, two neighboring flowerpot units may be directly coupled without having to use the connector unit.

Moreover, although the cultivating bed portion of each of the flowerpot units is greater in length than the coupling portion in the embodiment described above, the present invention is not limited thereto. Depending on the kinds of plants to be cultivated, the coupling portion may be greater in length than the cultivating bed portion.

In addition, although the side wall 321 having the inlet passage 33 and the outlet passage 35 is fixed to each of the flowerpot units 30 in the embodiment described above, the side wall 321 may be slidably attached so that the water level can be regulated by interchanging the positions of the inlet passage 33 and the outlet passage 35.

Figure 14:
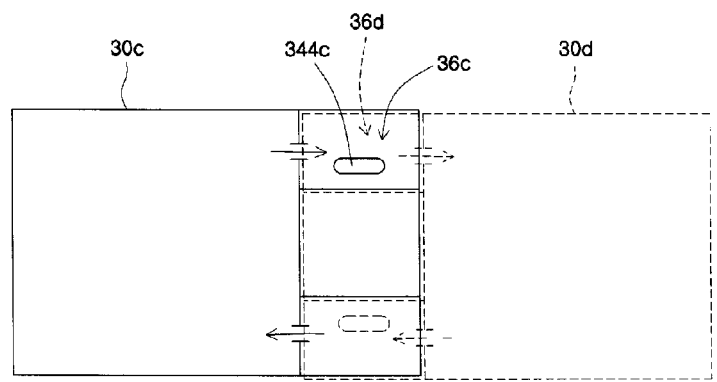
FIG. 14 is a top plan view illustrating a positional relationship between two adjoining flowerpot units shown in FIG. 11.

FIGS. 11 through 14 are views showing another example of the flowerpot unit of the plant cultivation apparatus shown in FIG. 1. Referring to FIGS. 11 through 14, a flowerpot unit 30c is provided with a coupling portion 34c that has a column-receiving tubular section 39c and first and second spaces 38c and 36c formed on the opposite sides of the column-receiving tubular section 39c. Such a structure is to allow two interconnected flowerpot units 30c and 30c to be arranged in opposite positions as shown in FIGS. 11 through 14. Referring to FIG. 14, the flowerpot unit 30c positioned above has a drainage hole 344c communicating with a second space 36d of the flowerpot unit 30d positioned below.

Figure 15:
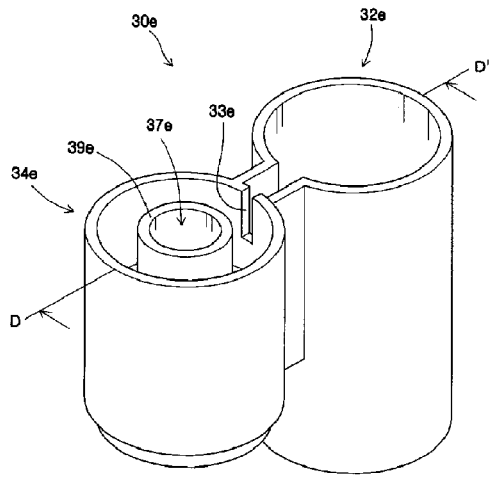
FIG. 15 is a perspective view showing a further example of the flowerpot unit of the plant cultivation apparatus shown in FIG. 1.
Figure 16:
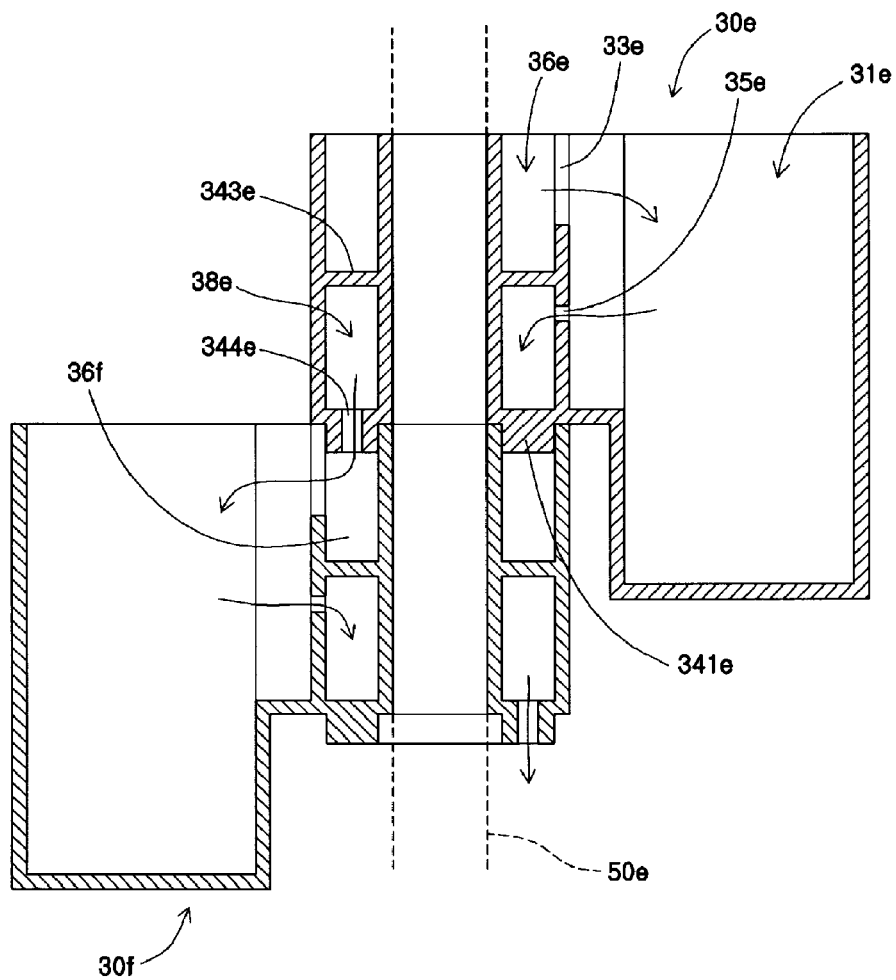
FIG. 16 is a section view of the flowerpot unit taken along line D-D' in FIG. 15, in which view two adjoining flowerpot units are shown together.

FIGS. 15 and 16 are views showing a further example of the flowerpot unit of the plant cultivation apparatus shown in FIG. 1. Referring to FIGS. 15 and 16, a flowerpot unit 30e includes a cylindrical cultivating bed portion 32e and a cylindrical coupling portion 34e. The coupling portion 34e is provided with a column-receiving tubular section 39e having a passageway 37e into which a cylindrical column (not shown) is inserted. The internal space of the coupling portion 34e is divided by an annular partition wall 343e into a lower first space 38e and an upper second space 36e, both of which are of an annular shape surrounding the column-receiving tubular section 39e. The second space 36e communicates with a cultivating compartment 31e of the cultivating bed portion 32e through a cutout 33e and the cultivating compartment 31e communicates with the first space 38e through an outlet passage 35e. The first space 38e communicates with a second space 36f of a lower flowerpot unit 30f through a drainage hole 344e formed in the bottom 341e of the coupling portion 34e.

Figure 17:
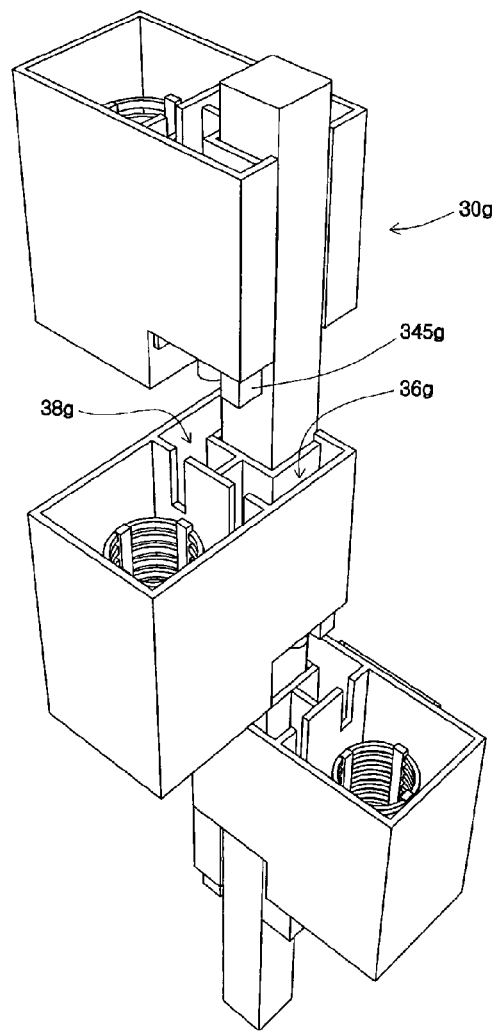
FIG. 17 is a perspective view showing some parts of a plant cultivation apparatus in accordance with another embodiment of the present invention.
Figure 18:
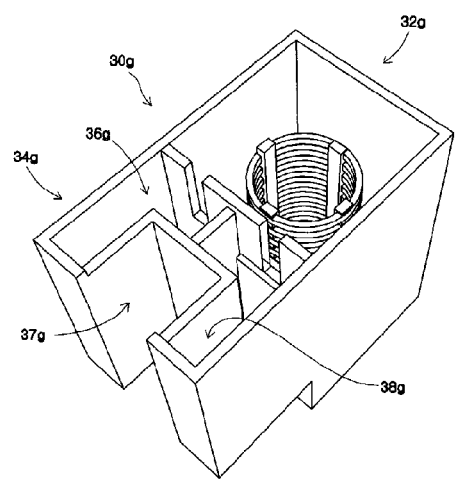
FIG. 18 is a perspective view illustrating a flowerpot unit of the plant cultivation apparatus shown in FIG. 17.

Referring to FIGS. 17 and 18, a plant cultivation apparatus in accordance with another embodiment of the present invention includes a flowerpot unit 30g having a column-receiving tubular section 37g, one side (the opposite side from a cultivating bed portion 32g) of which is opened. In one bottom corner of a coupling portion 34g, there is provided a protrusion portion 345g that can be inserted into a first space 38g or a second space 36g of a flowerpot unit 30g arranged below the protrusion portion 345g. Other configurations of the flowerpot unit 30g employed in the plant cultivation apparatus of the present embodiment are substantially the same as the corresponding configurations of the flowerpot unit shown FIGS. 3 to 6. Therefore, no description will be made in the regard.

Figure 19:
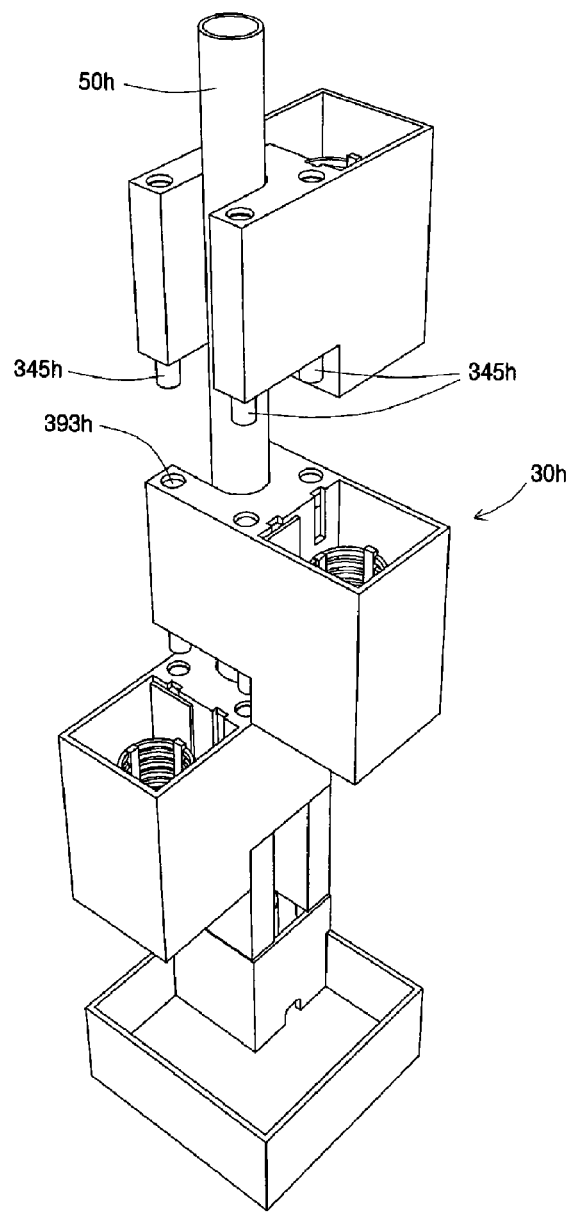
FIG. 19 a perspective view showing a plant cultivation apparatus in accordance with a further embodiment of the present invention.
Figure 20:
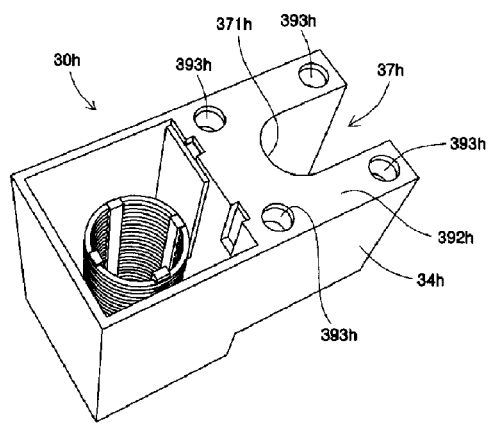
FIG. 20 is a perspective view illustrating a flowerpot unit of the plant cultivation apparatus shown in FIG. 19.

Referring to FIGS. 19 and 20, a plant cultivation apparatus in accordance with a further embodiment of the present invention includes a flowerpot unit 30h having a column-receiving tubular section 37h, the inner side 371h of which is of a semicircular shape and the outer side of which is opened. The flowerpot unit 30h has a coupling portion 34h, the top end of which is closed by a cover 392h. The cover 392h has insertion holes 393h formed in four corners thereof. Protrusion portions 345h are formed in four bottom corners of the coupling portion 34h so that they can be inserted into the corresponding insertion holes of a cover of a flowerpot unit arranged therebelow. The flowerpot unit 30h of this structure is suitable for use with a column 50h having a cylindrical shape. Other configurations of the flowerpot unit 30h employed in the plant cultivation apparatus of the present embodiment are substantially the same as the corresponding configurations of the flowerpot unit 30g shown FIGS. 17 and 18. Therefore, no description will be made in the regard.

Figure 21:
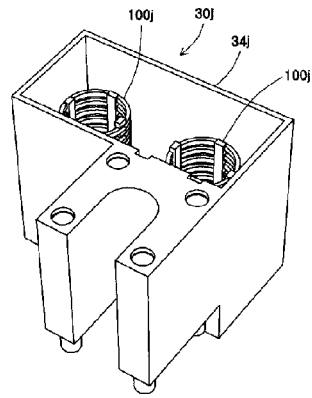
FIG. 21 is a perspective view illustrating another example of the flowerpot unit of the plant cultivation apparatus shown in FIG. 19.

Referring to FIG. 21, there is shown another example of the flowerpot unit of the plant cultivation apparatus shown in FIG. 19. A flowerpot unit 30*j* of this example includes a cultivating bed portion 34*j* having a width greater enough to receive two cultivating kits 100*j*. Other configurations of the flowerpot unit 30*j* are the same as the corresponding configurations of the flowerpot unit 30*h* shown FIGS. 19 and 20.

Figure 22:
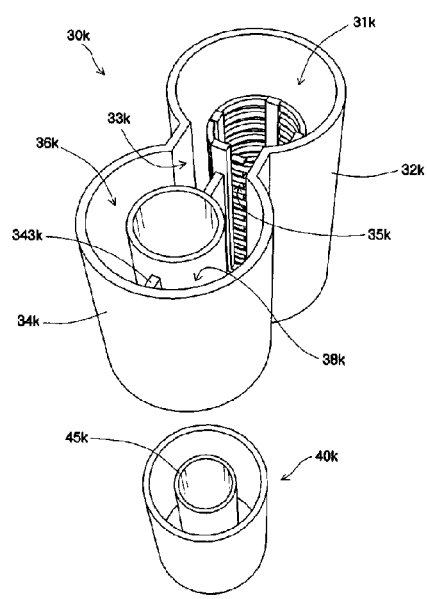
FIG. 22 is a perspective view illustrating a further example of the flowerpot unit of the plant cultivation apparatus shown in FIG. 19.

Referring to FIG. 22, there is illustrated a further example of the flowerpot unit of the plant cultivation apparatus shown in FIG. 19. A flowerpot unit 30*k* of this example includes a cylindrical cultivating bed portion 32*k* and a cylindrical coupling portion 34*k*. The coupling portion 34*k* is provided with a partition wall 343*k* extending upright from the bottom (not shown) thereof. The partition wall 343*k* divides the internal space of the coupling portion 34*k* into a first space 38*k* and a second space 36*k* which in turn communicate with a cultivating compartment 31*k* of the cultivating bed portion 32*k* through an inlet passage 33*k* and an outlet passage 35*k*, respectively. Coupled to the coupling portion 34*k* is a cylindrical connector unit 40*k* having a cylindrical column-receiving tubular section 45*k* formed at the center thereof.

Figure 23:
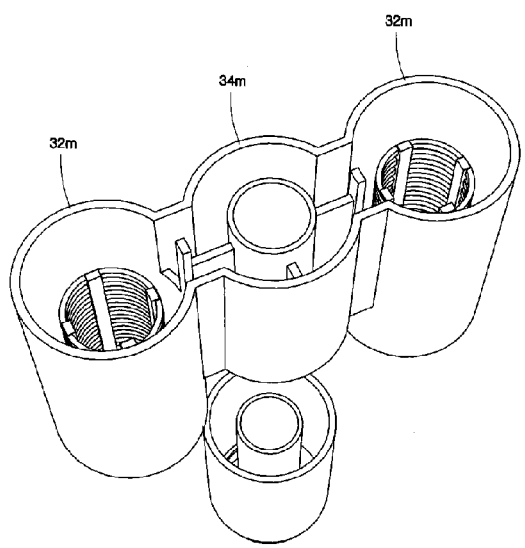
FIG. 23 is a perspective view illustrating a still further example of the flowerpot unit of the plant cultivation apparatus shown in FIG. 19.

Referring to FIG. 23, there is illustrated a still further example of the flowerpot unit of the plant cultivation apparatus shown in FIG. 19. A flowerpot unit of this example includes a pair of cylindrical cultivating bed portions 32*m* formed on the opposite sides of a coupling portion 34*m*. Other configurations of the flowerpot unit of this example are the same as the corresponding configurations of the flowerpot unit 30*k* shown FIG. 22. Therefore, no description will be made in the regard.

Figure 24:
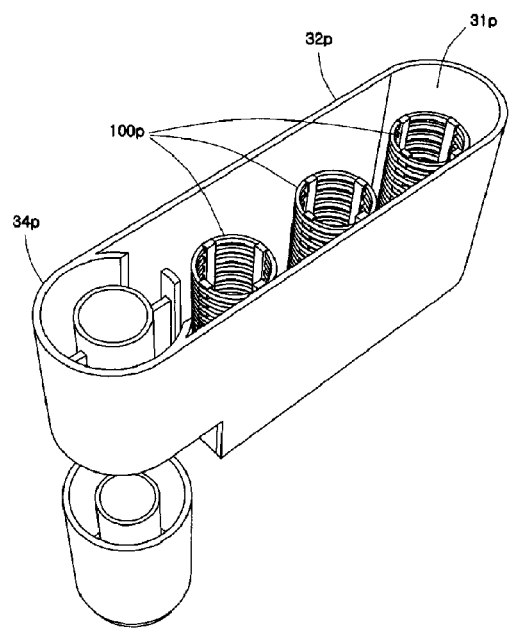
FIG. 24 is a perspective view illustrating a yet still further example of the flowerpot unit of the plant cultivation apparatus shown in FIG. 19.

Referring to FIG. 24, there is illustrated a yet still further example of the flowerpot unit of the plant cultivation apparatus shown in FIG. 19. A flowerpot unit of this example includes a cultivating bed portion 32*p* and a coupling portion 34*p*. The cultivating bed portion 32*p* extends long radially outwardly from the coupling portion 34*p* to receive a plurality of (three) cultivating kit 100*p* within a cultivating compartment 31*p* thereof. Other configurations of the flowerpot unit of this example are the same as the corresponding configurations of the flowerpot unit 30*k* shown FIG. 22. Therefore, no description will be made in the regard.

Figure 25:
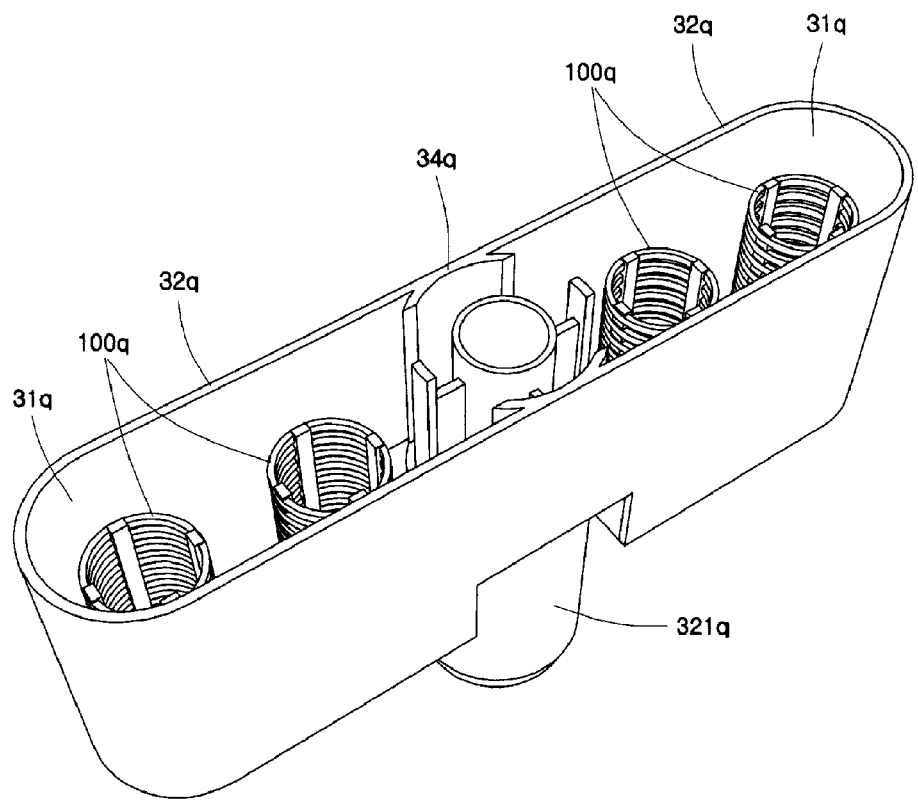
FIG. 25 is a perspective view illustrating a yet still further example of the flowerpot unit of the plant cultivation apparatus shown in FIG. 19.

Referring to FIG. 25, there is illustrated a yet still further example of the flowerpot unit of the plant cultivation apparatus shown in FIG. 19. A flowerpot unit of this example includes a pair of cultivating bed portions 32*q* formed on the opposite sides of a coupling portion 34*q*. Each of the cultivating bed portions 32*q* extends long radially outwardly from the coupling portion 34*q* to receive a plurality of (two) cultivating kit 100*q* within a cultivating compartment 31*q* thereof. Other configurations of the flowerpot unit of this example are the same as the corresponding configurations of the flowerpot unit shown FIG. 24. Therefore, no description will be made in the regard.

Figure 26:
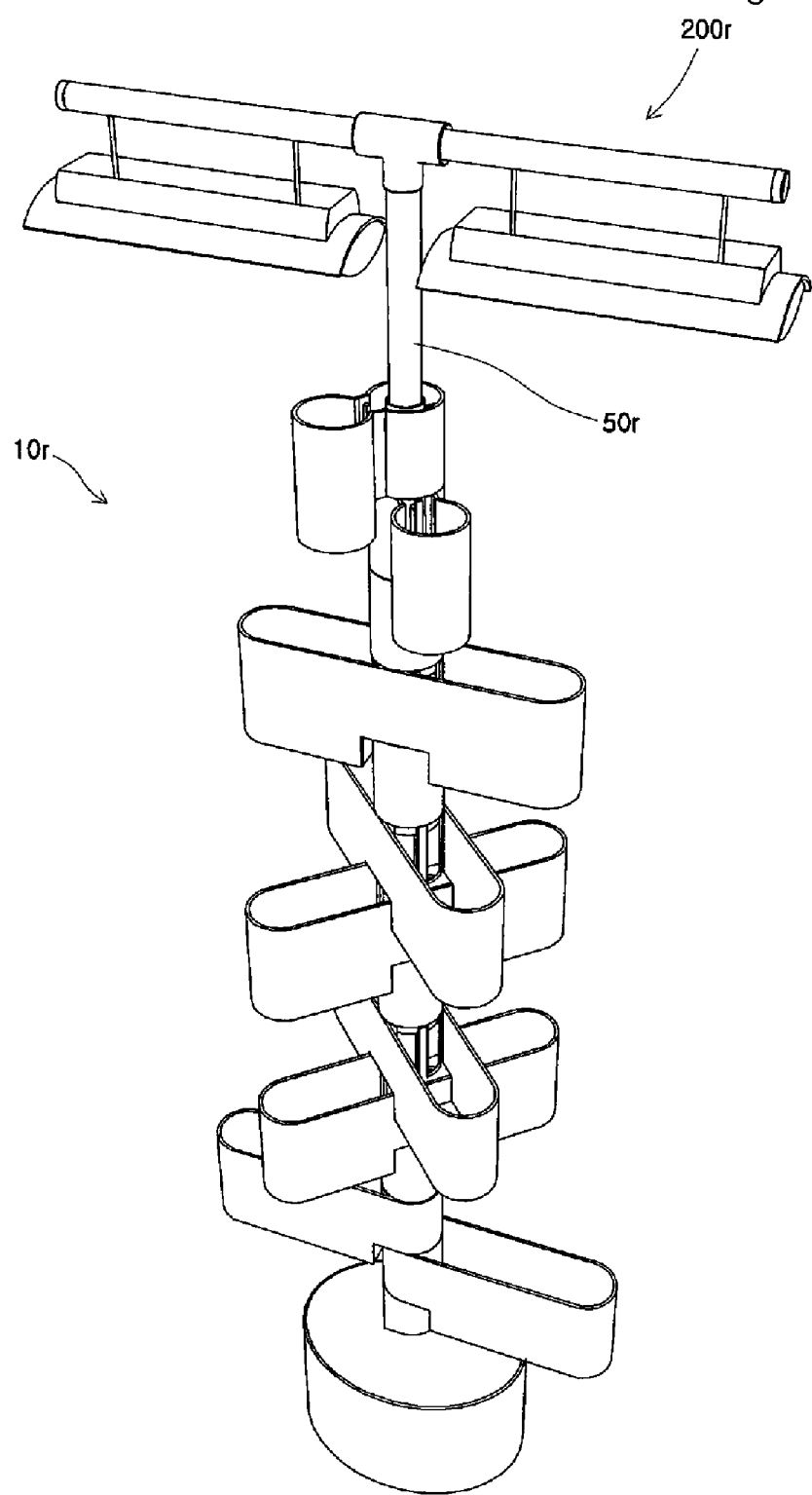
FIG. 26 a perspective view showing a plant cultivation apparatus in accordance with a still further embodiment of the present invention.

Referring to FIG. 26, a plant cultivation apparatus 10*r* in accordance with a still further embodiment of the present invention includes an illuminating device 200*r* installed on the top end of a column 50*r*. Although not shown, the illuminating device 200*r* is supplied with electric power through an electric wire extending within the internal space of the column 50*r*.

Figure 28:
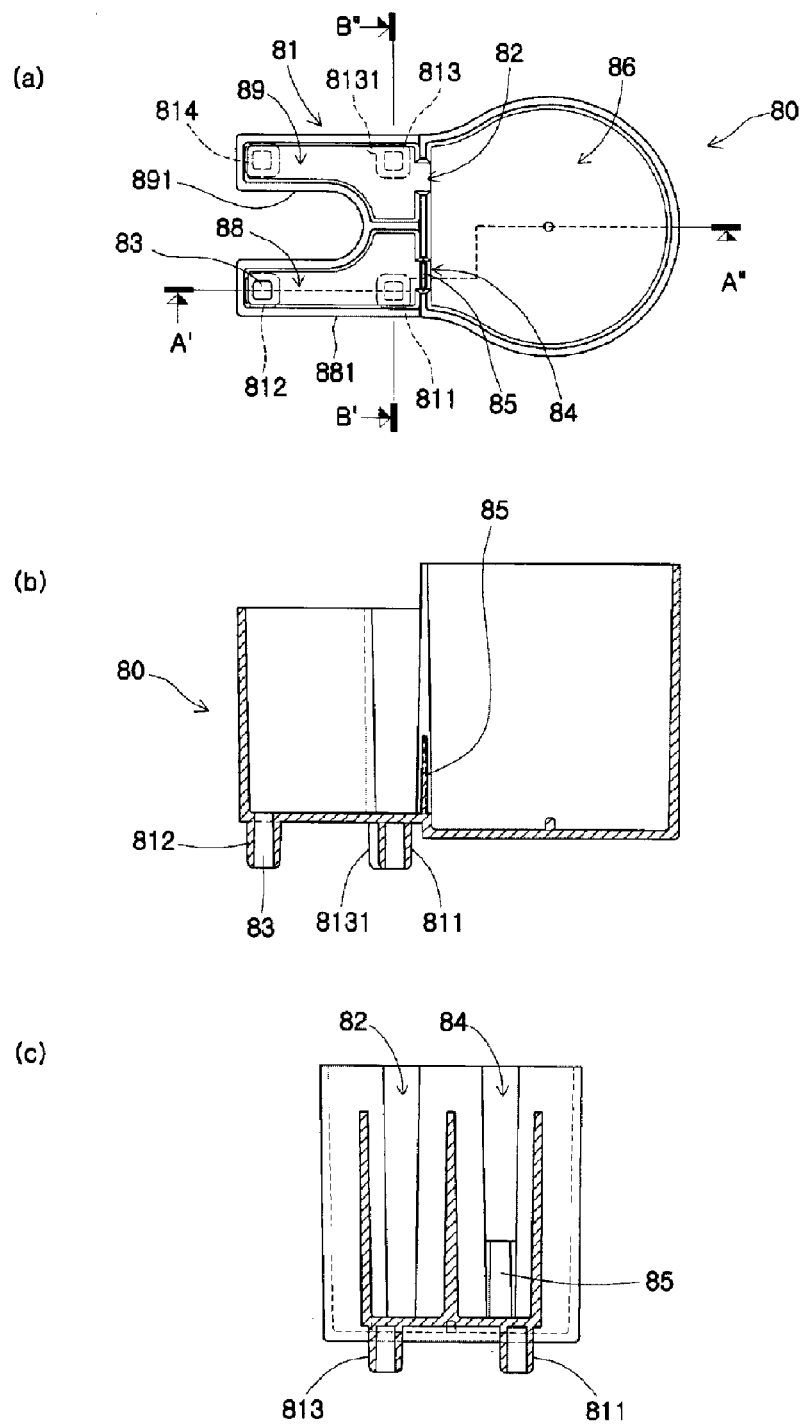
FIG. 28(a) is a top plan view illustrating a flowerpot unit of the plant cultivation apparatus shown in FIG. 27, FIG. 28(b) being a section view taken along line A-A' in FIG. 28(a), and FIG. 28(c) being a section view taken along line B-B' in FIG. 28(a).

Referring to FIGS. 27(*a*) and 27(*b*), a plant cultivation apparatus in accordance with a yet still further embodiment of the present invention includes a plurality of flowerpot units 80 arranged one above another in a spiral shape so that two neighboring flowerpot units 80 can make a right angle with respect to each other. As can be seen in FIGS. 28(*a*), 28(*b*) and 28(*c*), each of the flowerpot units 80 has an inlet passage 82 and an outlet passage 84, the height of which can be adjusted by a removable water level control member 85. The water level control member 85 can be manually removed with ease by breaking edge portions thereof. In the illustrated embodiment, the water level control member 85 is removed from the inlet passage 82 but the water level control member 85 remains intact in the outlet passage 84. This means that the water level in a cultivating bed portion 86 is kept flush with the top end of the water level control member 85. If the water level control member 85 is removed from the outlet passage 84, the water level in a cultivating bed portion 86 will be lowered accordingly. The flowerpot unit 80 has a coupling portion 81 of a generally horseshoe shape and consists of a first extension 881 having a first internal space 88 and a second extension 891 having a second internal space 89. Although the water level is adjusted by selectively breaking the water level control member 85 in this embodiment, the present invention is not limited thereto. Alternatively, the water level control member 85 may be designed to slidingly move along a groove.

First through fourth protrusion portions 811, 812, 813 and 814 extend downwardly from four bottom corners of the coupling portion 81 so that they can be inserted into the internal spaces of a coupling portion of a flowerpot unit arranged therebelow. The first and second protrusion portions 811 and 812 are arranged in the bottom of the first space 88 of the coupling portion 81. The first protrusion portion 811 lies adjacent to the cultivating bed portion 86 and the second protrusion portion 812 lies at the end of the first extension 881. A drainage hole 812 is formed in the second protrusion portion 812. The third and fourth protrusion portions 813 and 814 are arranged in the bottom of the second space 89 of the coupling portion 81. The third protrusion portion 813 lies adjacent to the cultivating bed portion 86 and the fourth protrusion portion 814 lies at the end of the second extension 891. The third protrusion portion 813 has a raised portion 8131 extending toward the fourth protrusion portion 814. The raised portion 8131 serves to prevent one flowerpot unit 80 from being abnormally coupled to another flowerpot unit 80. That is to say, the raised portion 8131 serves to inhibit wrong coupling of the flowerpot units 80 which would otherwise cause the water drained from an upper flowerpot unit to be introduced into the first space of a lower flowerpot unit. If an attempt is made to couple two adjoining flowerpot units 80 in a wrong coupling position, the raised portion 8131 strikes against an outer wall of the second extension 891, thereby stopping the coupling process. In other coupling positions, the raised portion 8131 allows two adjoining flowerpot units 80 to be freely coupled to each other.

Figure 30:
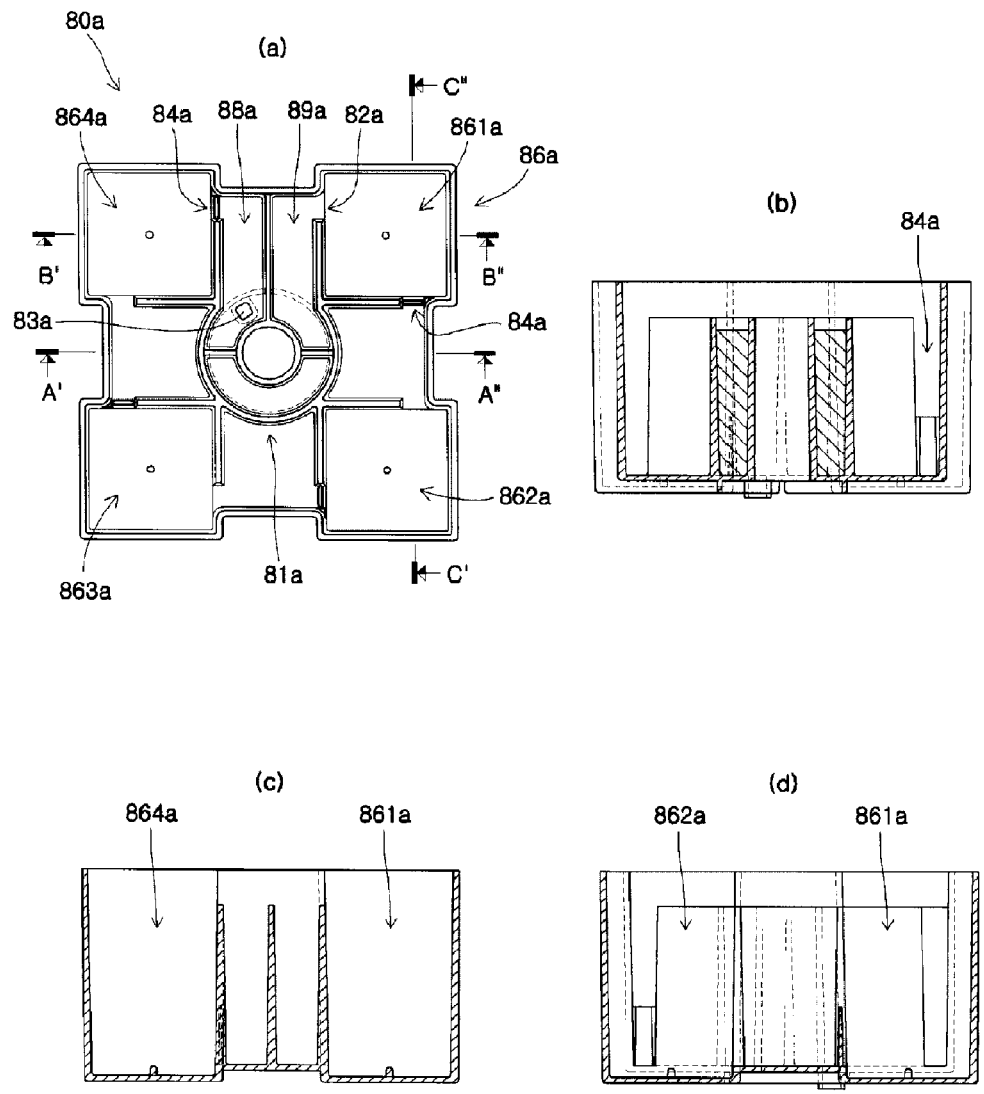
FIG. 30(a) is a top plan view illustrating a flowerpot unit of the plant cultivation apparatus shown in FIG. 29, FIG. 30(b) being a section view taken along line A-A' in FIG. 30(a), FIG. 30(c) being a section view taken along line B-B' in FIG. 30(a), and FIG. 30(d) being a section view taken along line C-C' in FIG. 30(a).

Referring to FIGS. 29 and 30, a plant cultivation apparatus in accordance with a yet still further embodiment of the present invention includes a flowerpot unit 80*a* having a central coupling portion 81*a* and a cultivating bed portion 86*a* formed to surround the coupling portion 81*a*. The cultivating bed portion 86*a* has first to fourth cultivating compartments 861*a*, 862*a*, 863*a* and 864*a* arranged around the coupling portion 81*a*. The first cultivating compartment 861*a* has an inlet passage 82*a* communicating with a second space 89*a* of the coupling portion 81*a* and an outlet passage 84*a* communicating with the second cultivating compartment 862*a*. The inlet passage 82*a* and the outlet passage 84*a* have the same configurations as those of the embodiment shown in FIGS. 27 and 28. The second to fourth cultivating compartments 862*a*, 863*a* and 864*a* have the same configurations as that of the first cultivating compartment 861*a*. The fourth cultivating compartment 864*a* has an outlet passage 84*a* communicating with a first space 88*a* in which a drainage hole 83*a* is formed. This ensures that the water introduced into the flowerpot unit 80*a* flows through the first to fourth cultivating compartments 861a, 862a, 863a and 864a one after another and then is drained to the flowerpot unit arranged therebelow.

Figure 31:
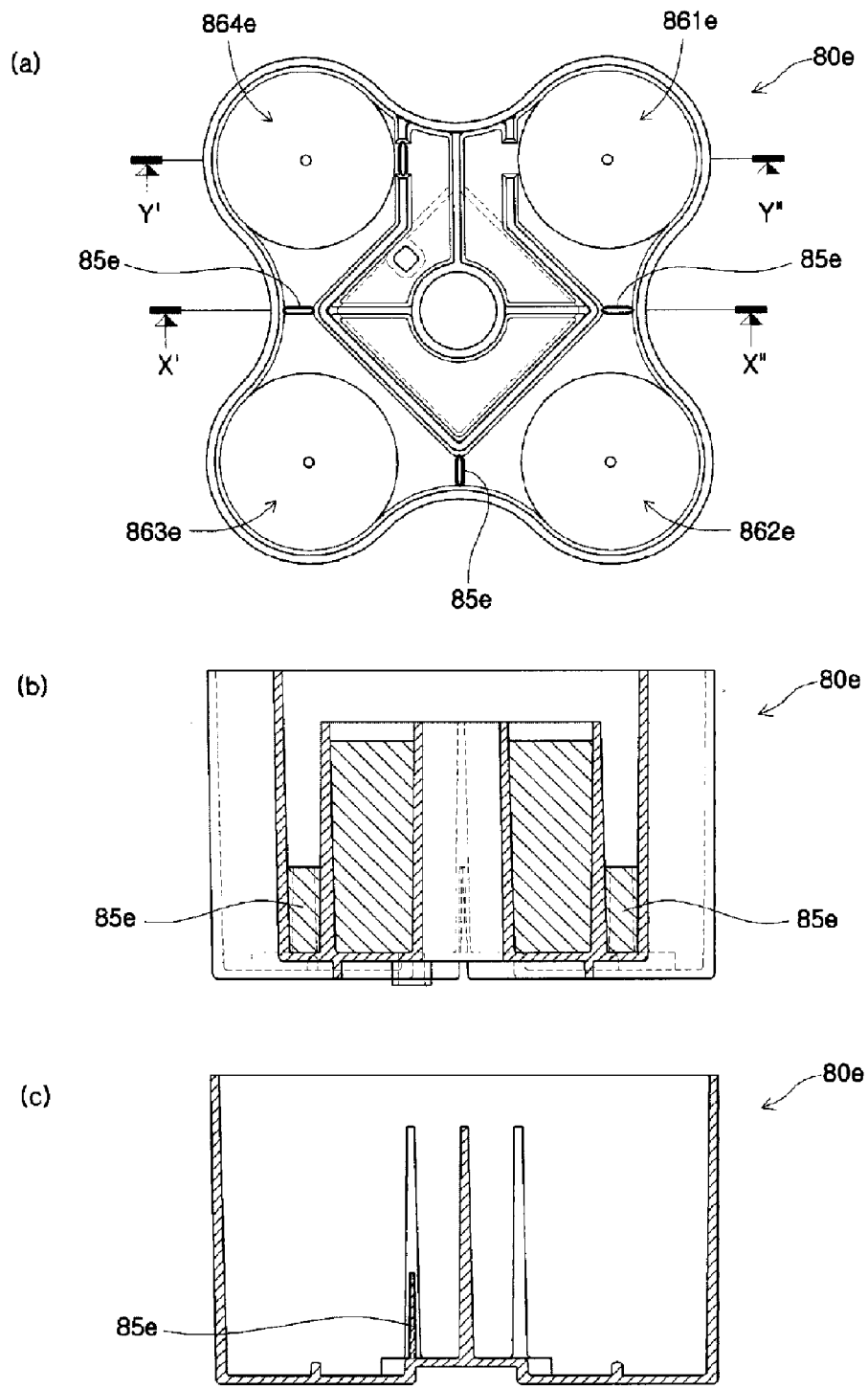
FIG. 31(a) is a top plan view illustrating another example of the flowerpot unit of the plant cultivation apparatus shown in FIG. 29, FIG. 31(b) being a section view taken along line X-X' in FIG. 31(a), and FIG. 31(c) being a section view taken along line Y-Y' in FIG. 31(a).

Referring to FIG. 31, there is shown another example of the flowerpot unit of the plant cultivation apparatus shown in FIG. 29. A flowerpot unit 80e of this example is generally similar in configuration to the flowerpot unit shown in FIG. 30. The flowerpot unit 80e has first to fourth cultivating compartments 861e, 862e, 863e and 864e. Water passages are formed between the first and second cultivating compartments 861e and 862e, between the second and third cultivating compartments 862e and 863e, and between the third and fourth cultivating compartments 863e and 864e. Removable water level control members 85e are provided in the respective water passages. Other configurations of the flowerpot unit of this example are substantially the same as the corresponding configurations of the flowerpot unit shown FIG. 30.

Figure 32:
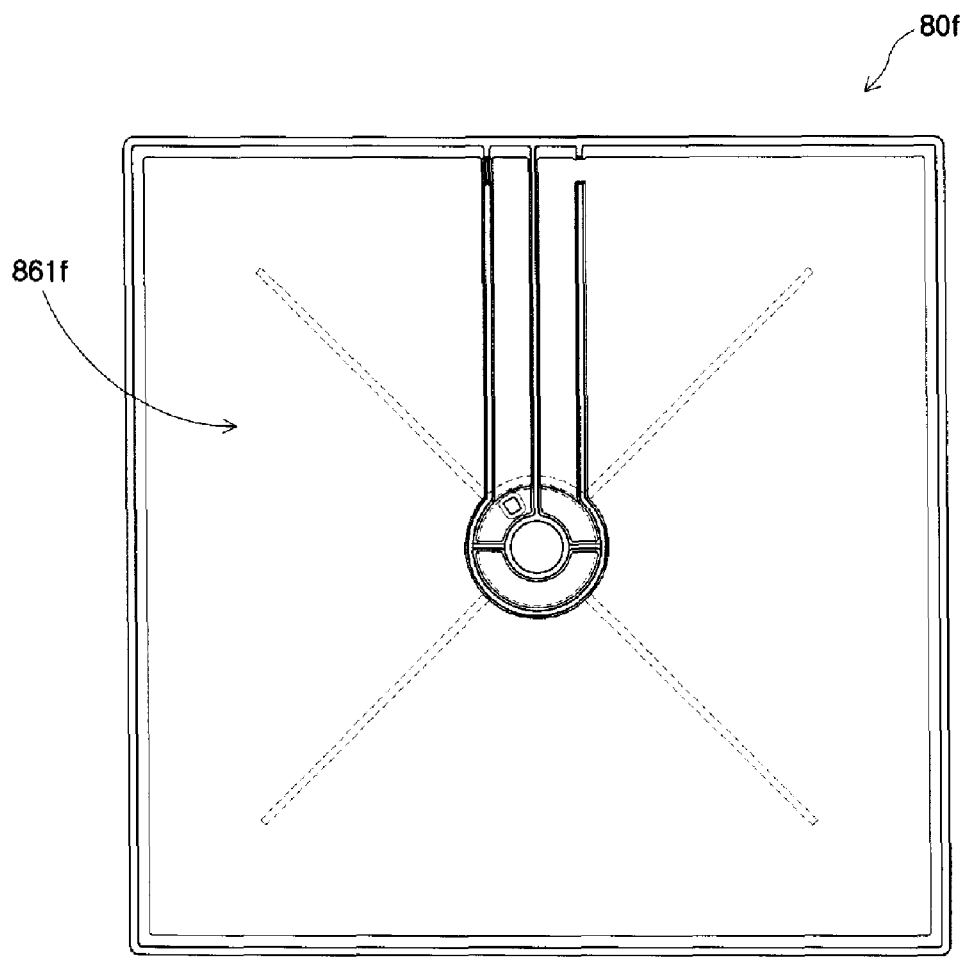
FIG. 32 is top plan view illustrating a further example of the flowerpot unit of the plant cultivation apparatus shown in FIG. 29.

Referring to FIG. 32, there is shown a further example of the flowerpot unit of the plant cultivation apparatus shown in FIG. 29. A flowerpot unit 80f of this example differs from the flowerpot unit shown in FIG. 30 in that it has a single cultivating compartment 861f. Other configurations of the flowerpot unit of this example are the same as the corresponding configurations of the flowerpot unit shown FIG. 30.

Referring to FIGS. 33 and 34, a plant cultivation apparatus in accordance with a yet still further embodiment of the present invention includes a flowerpot unit 80b having a coupling portion 81b divided into first to third spaces 88b, 89b and 90b which are circumferentially arranged with an angular interval of about 60 degrees. The first space 88b has a drainage hole 83b and an outlet passage 84b, the latter of which communicates with a cultivating compartment 861b. The second space 89b has an inlet passage 82b communicating with the cultivating compartment 861b. On the bottom of the coupling portion 81b, there are provided first to third protrusion portions 811b, 812b and 813b downwardly extending from the positions corresponding respectively to the first to third spaces 88b, 89b and 90b. The first protrusion portion 811b has a raised portion 8111b projecting laterally outwardly. The raised portion 8111b allows the first protrusion portion 811b of an upper flowerpot unit to be inserted only into the second space 812b of a lower flowerpot unit, thereby assuring correct coupling of the upper and lower flowerpot units. The makes sure that the water drained from the upper flowerpot unit through the drainage hole 83b is supplied to the second space 89b of the coupling portion 81b of the lower flowerpot unit.

Referring to FIGS. 35 and 36, a plant cultivation apparatus in accordance with a yet still further embodiment of the present invention is similar in configuration to the embodiment shown in FIG. 30 and includes a coupling portion 81c and three circular cultivating compartments 861c circumferentially arranged around the coupling portion 81c.

Figure 37:
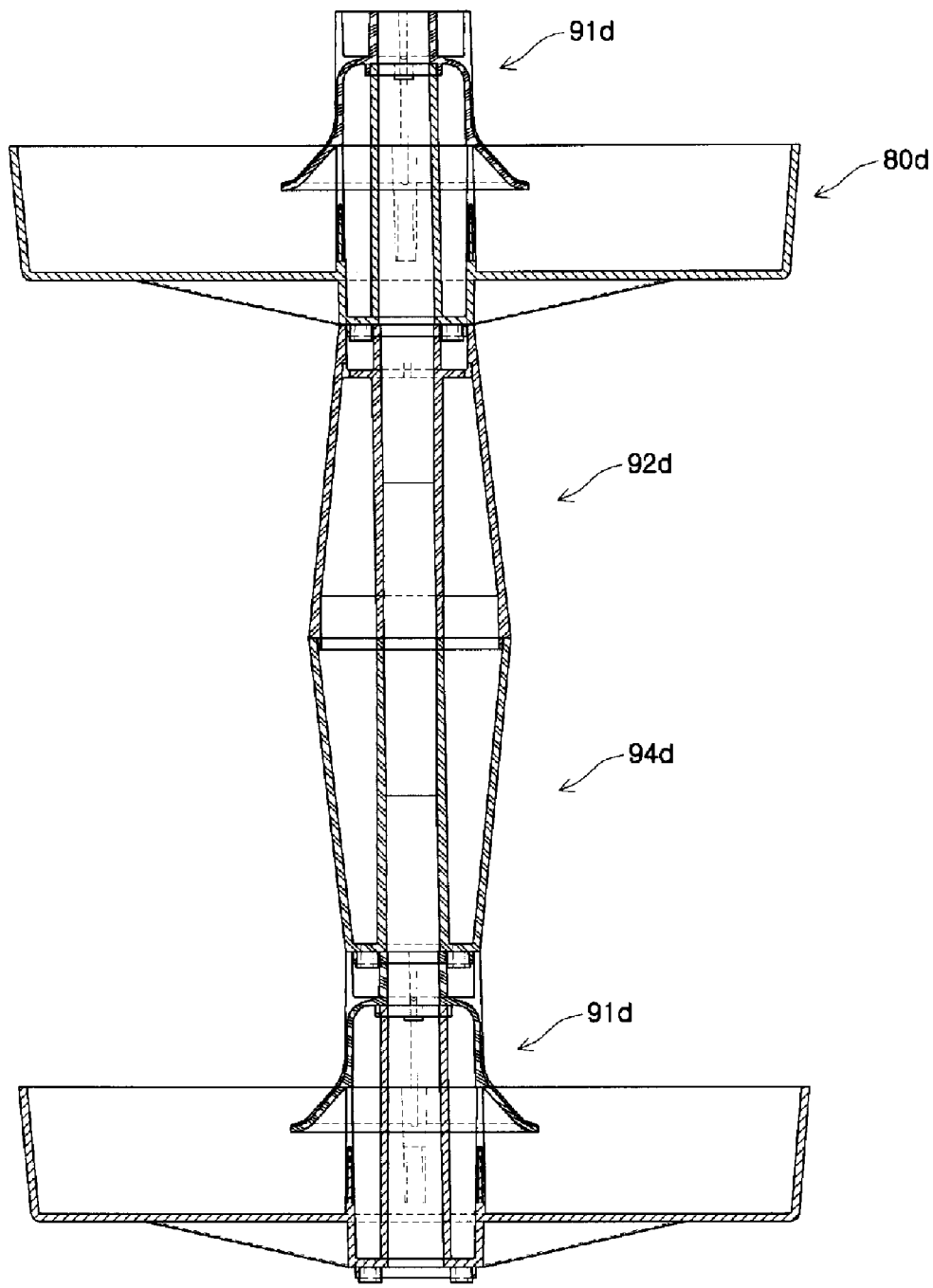
FIG. 37 is a side elevational section view showing some parts of a plant cultivation apparatus in accordance with a yet still further embodiment of the present invention.

Referring to FIG. 37, a plant cultivation apparatus in accordance with a yet still further embodiment of the present invention includes a water supply unit 91d, a flowerpot unit 80d, an upper connector unit 92d and a lower connector unit 94d, respectively arranged one below another. As can be seen in FIGS. 37 and 38, the flowerpot unit 80d includes a central square coupling portion 81d and a peripheral square cultivating bed portion 86d formed around the coupling portion 81d. The coupling portion 81d communicates with the cultivating bed portion 86d through an outlet passage 84d. A central tubular section 821d is formed at the center of the coupling portion 81d. The coupling portion 81d has a first space 88d defined around the central tubular section 821d. The internal space of the cultivating bed portion 86d serves as a second space or a cultivating compartment into which water is introduced. The first space 88d has a drainage hole 83d formed on the bottom thereof. Projecting portions 811d extend downwardly from four bottom corners of the coupling portion 81d. The projecting portions 811d are snugly fitted to the top of the upper connector unit 92d described later.

Figure 39:
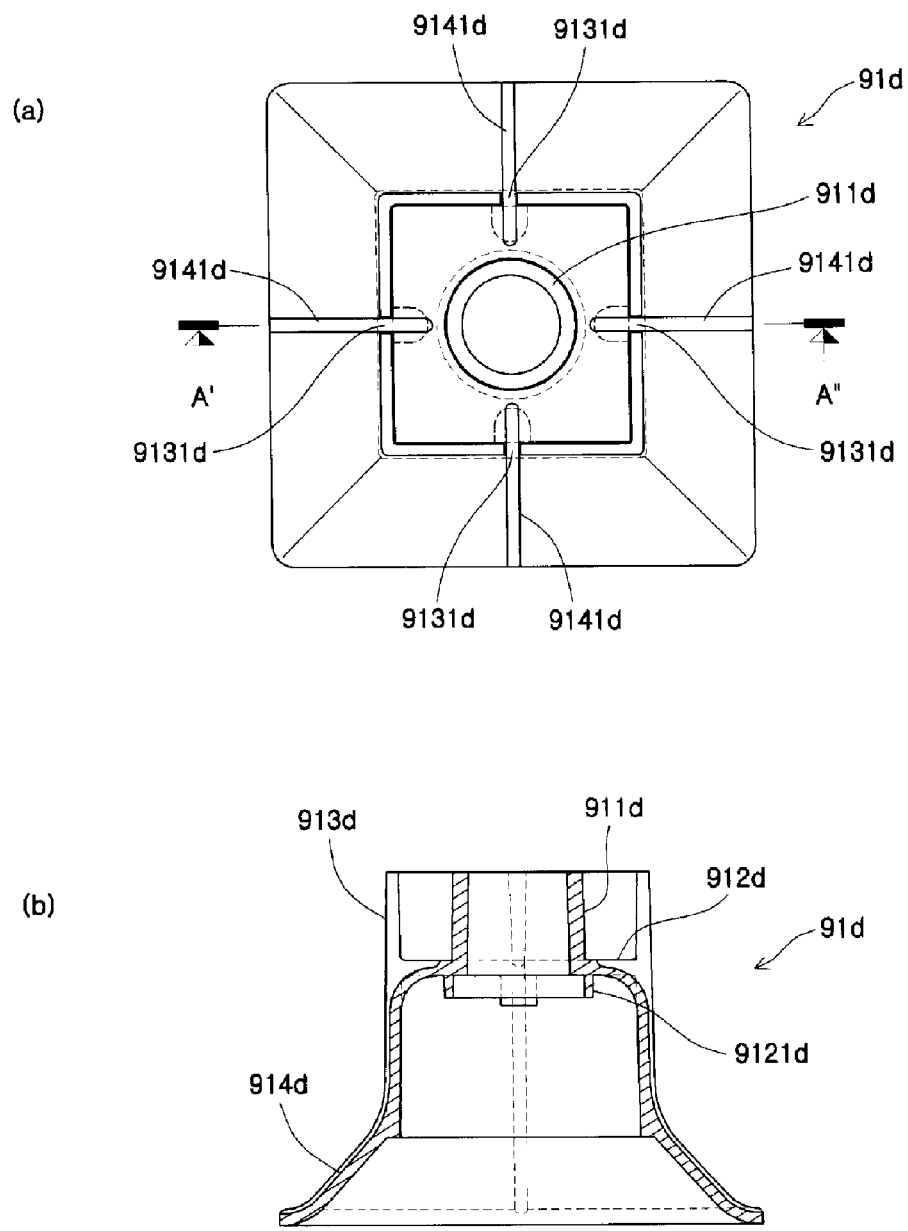
FIG. 39(a) is a top plan view illustrating a water supply unit of the plant cultivation apparatus shown in FIG. 37
FIG. 39(b) is a side elevational section view thereof.
Figure 42:
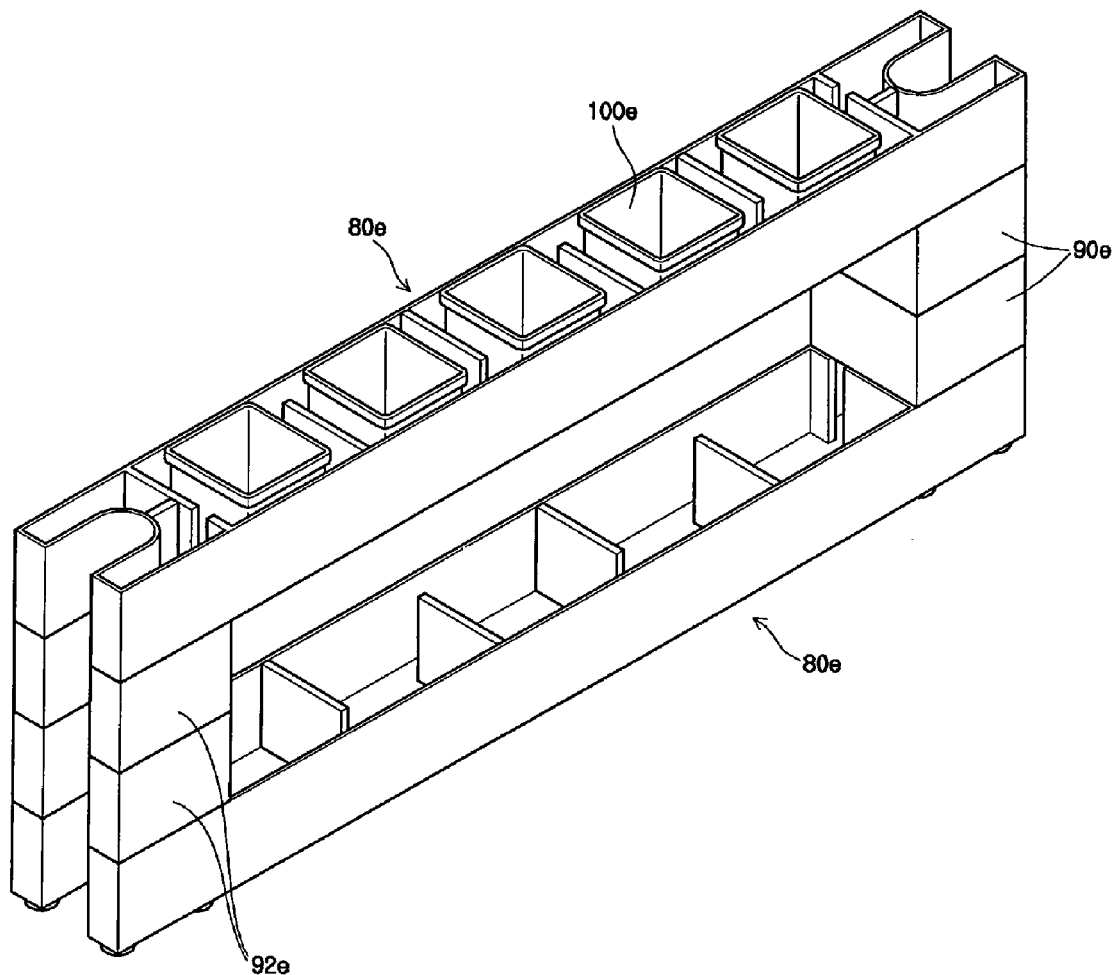
FIG. 42 is a perspective view showing some parts of a plant cultivation apparatus in accordance with a yet still further embodiment of the present invention.
Figure 43:
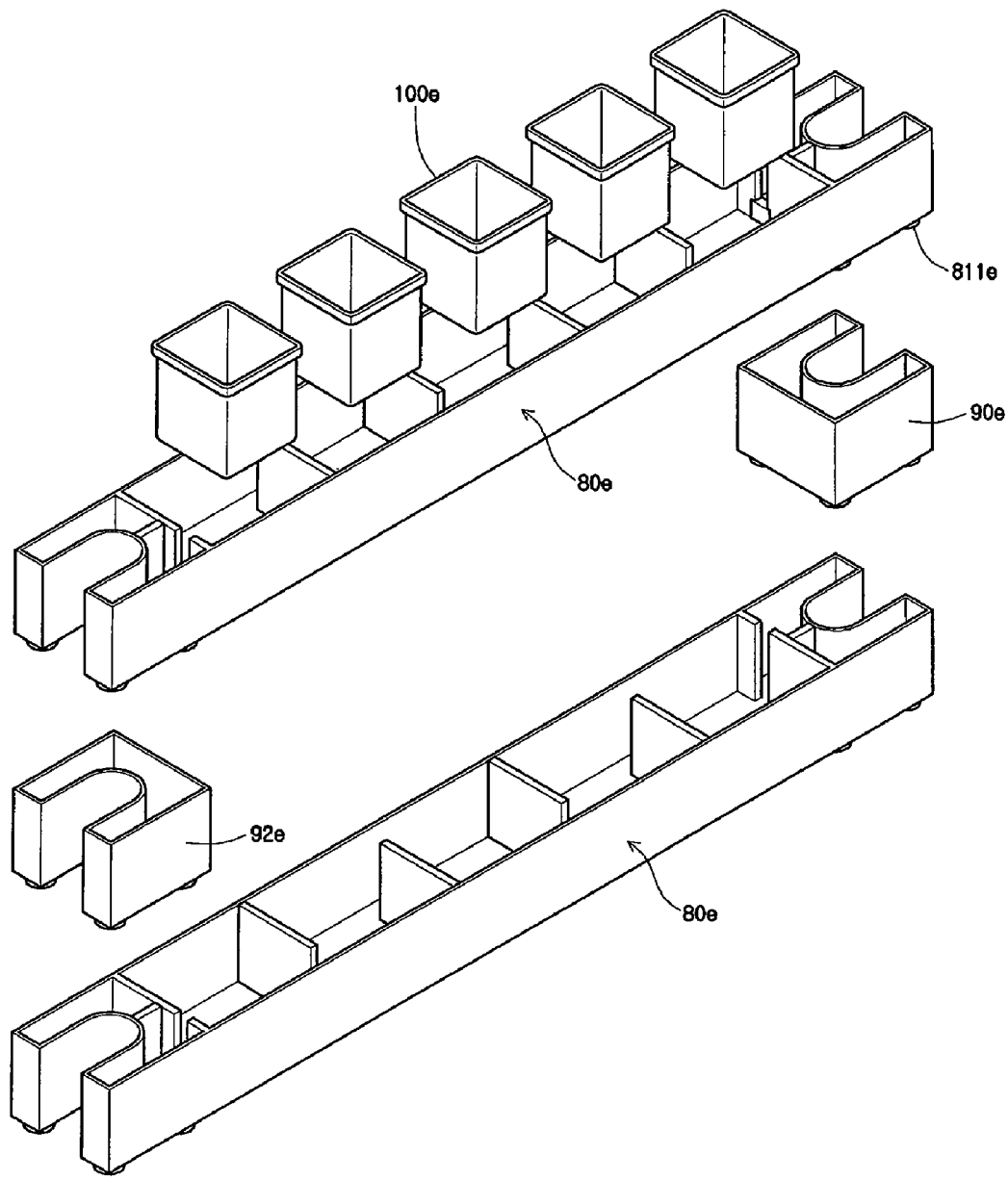
FIG. 43 is an exploded perspective view of the plant cultivation apparatus shown in FIG. 42.
Figure 44:
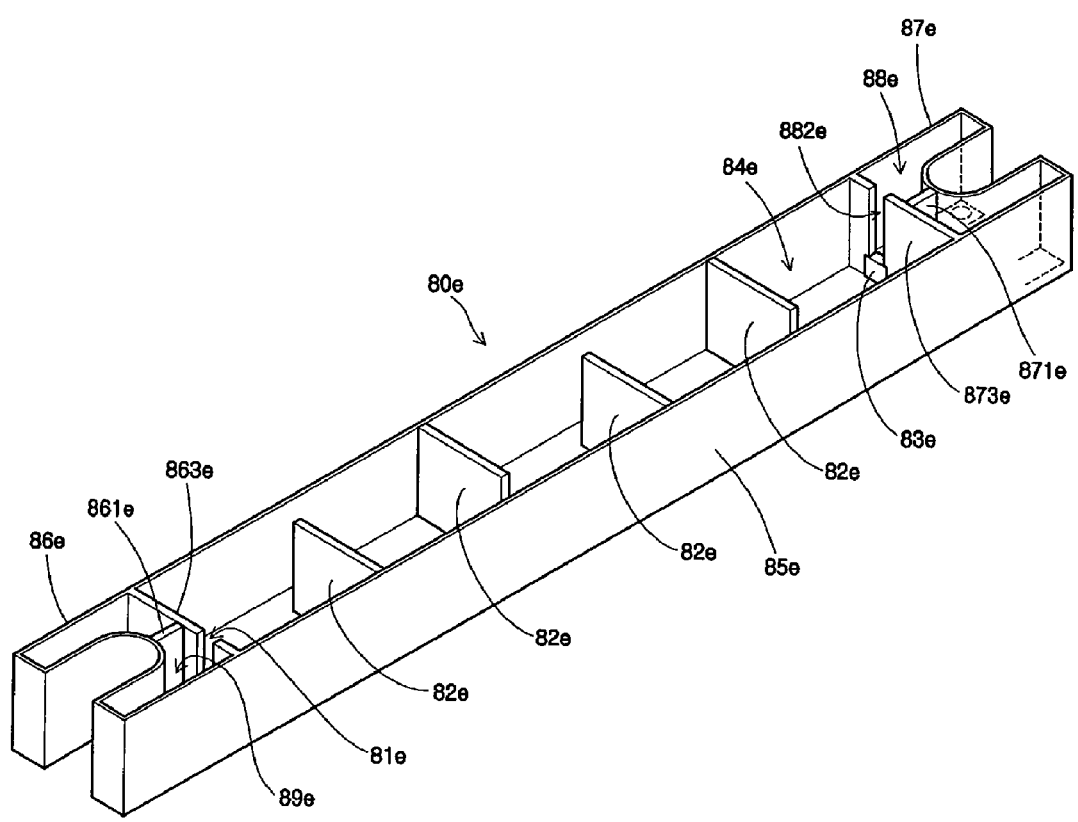
FIG. 44 is a perspective view showing a flowerpot unit employed in the plant cultivation apparatus shown in FIG. 42.

As shown in FIGS. 37 and 39, the water supply unit 91d includes a square support plate 912d, a central tubular section 911d extending upwardly from the center of the support plate 912d, a first side wall 913d extending upwardly from the edge of the support plate 912d and a second side wall 914d extending downwardly from the edge of the support plate 912d. On a lower surface of the support plate 912d, there is provided a flange 9121d to which the central tubular section 821d of the flowerpot unit 80d is snugly fitted. The first side wall 913d has four slits 9131d through which water flows to the outside. On the outer surface of the second side wall 914d, there are formed four water guide grooves 9141d in alignment of the slits 9131d. The second side wall 914d has a flared skirt portion inclined downwardly and outwardly. Water is introduced into the internal space of the first side wall 913d and then drained to the outside through the slits 9131d. Flowing along the water guide grooves 9141d, the water is supplied to the cultivating bed portion 86d of the flowerpot unit 80d.

As can be seen in FIGS. 37 and 40, the upper connector unit 92d includes a square support plate 921d, a central tubular section 922d extending upwardly and downwardly from the center of the support plate 921d, and a peripheral wall 923d extending upwardly and downwardly from the edge of the support plate 921d. The support plate 921d has communication holes 9211d through which water can pass. The protrusion portions 811d of the flowerpot unit 80d are inserted into the coupling space provided on the top of the support plate 921d.

As illustrated in FIGS. 37 and 41, the lower connector unit 94d includes a square support plate 941d, a central tubular section 942d extending upwardly from the center of the support plate 941d, and a peripheral wall 943d extending upwardly from the edge of the support plate 941d. The support plate 941d has a plurality of communication passages 9411d through which water can pass. Projecting portions 9412d extend downwardly from four bottom corners of the support plate 941d. The projecting portions 9412d are snugly fitted to the top of the water supply unit 91d and upper connector unit 92d. The upper connector unit 92d is snugly fitted at its bottom end to the top of the lower connector unit 94d.

Referring to FIGS. 42 to 45, the plant cultivation apparatus includes a flowerpot unit 80e, a plurality of cultivating kits 100e and two connecting units 90e and 92e. The flowerpot unit 80e includes a first coupling portion 87e with a first space 88e, a second coupling portion 86e with a second space 89e, and a cultivating bed portion 85e having a cultivating compartment 84e defined between the first and second coupling portions 87e and 86e by means of two partition walls 873e and 863e. The first and second coupling portions 87e and 86e have opposite end walls which are inwardly recessed to receive a column (not shown). The first space 88e of the first coupling portion 87e and the cultivating compartment 84e of the cultivating bed portion 85e communicate with each other through a vertical slot-like outlet passage 882e formed in the partition wall 873e, so that water can flow therebetween through the outlet passage 882e. The first space 88e of the first coupling portion 87e is isolated from another space within the first coupling portion 87e by means of a partition wall 871e. The second space 89e of the second coupling portion 86e and the cultivating compartment 84e of the cultivating bed portion 85e communicate with each other through a vertical slot-like inlet passage 81e formed in the partition wall 863e, so that water can flow therebetween through the inlet passage 81e.

The second space 84e of the second coupling portion 86e is isolated from another space within the second coupling portion 86e by means of a partition wall 861e. The cultivating bed portion 85e is elongated in a horizontal direction and is divided into a plurality of cultivating regions 841e by a plurality of dividing walls 82e arranged along an extension direction of the cultivating bed portion 85e. The dividing walls 82e are alternately opened at one lateral end thereof so that water can flow in zigzag. The cultivating kits 100e are used in a state that they are placed into the respective cultivating regions 841e. A drainage hole 881e is formed on the bottom of the first space 88e of the first coupling portion 87e. A water level control member 83e for controlling the water level in the cultivating compartment 84e is fitted to the outlet passage 882e. The water level control member 83e is height-adjustably attached to the outlet passage 882e and can be removed, if necessary. Protrusion portions 811e extends downwardly from the bottom of each of the first and second coupling portions 87e and 86e. The protrusion portions 811e are fitted to the connecting units 90e and 92e, thereby assisting in coupling the flowerpot unit 80e and the connecting units 90e and 92e together.

The connecting units 90e and 92e include a first connecting unit 90e and a second connecting unit 92e. The first connecting unit 90e has the same construction as that of the first coupling portion 87e of the flowerpot unit 80e. The first connecting unit 90e is connected to the underside of the first coupling portion 87e. Another first connecting unit or the second coupling portion 86e of the lower flowerpot unit 80e is connected to the underside of the first connecting unit 90e. The second connecting unit 92e has the same construction as that of the second coupling portion 86e of the flowerpot unit 80e. The second connecting unit 92e is connected to the underside of the second coupling portion 86e. Another second connecting unit or the first coupling portion 87e of the lower flowerpot unit 80e is connected to the underside of the second connecting unit 92e.

Water is introduced into the second space 89e of the flowerpot unit 80e and then into the cultivating compartment 84e through the inlet passage 81e. The water in the cultivating compartment 84e is allowed to flow through the respective cultivating regions 841e and then introduced into the first space 88e via the outlet passage 882e. The water in the first space 88e is introduced into the first connecting unit 90e through the drainage hole 811e and then into another first connecting unit or the second space 87e of another flowerpot unit.

Figure 45:
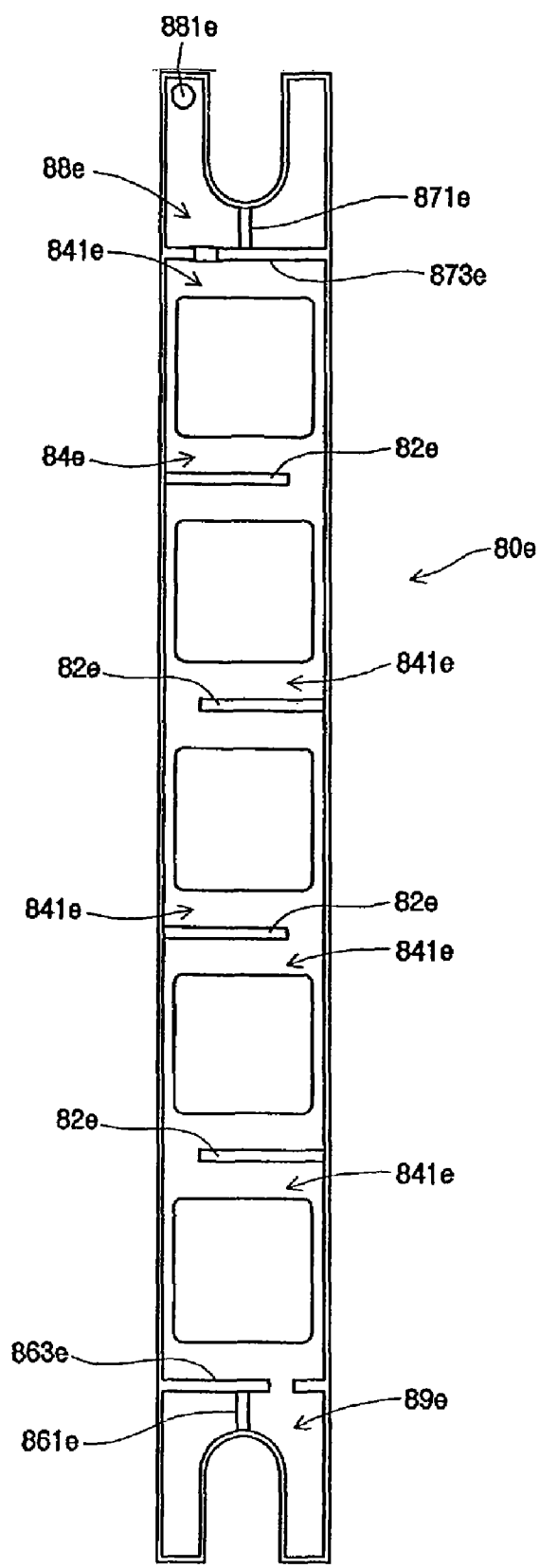
FIG. 45 is a plan view of the flowerpot unit shown in FIG. 44.
Figure 48:
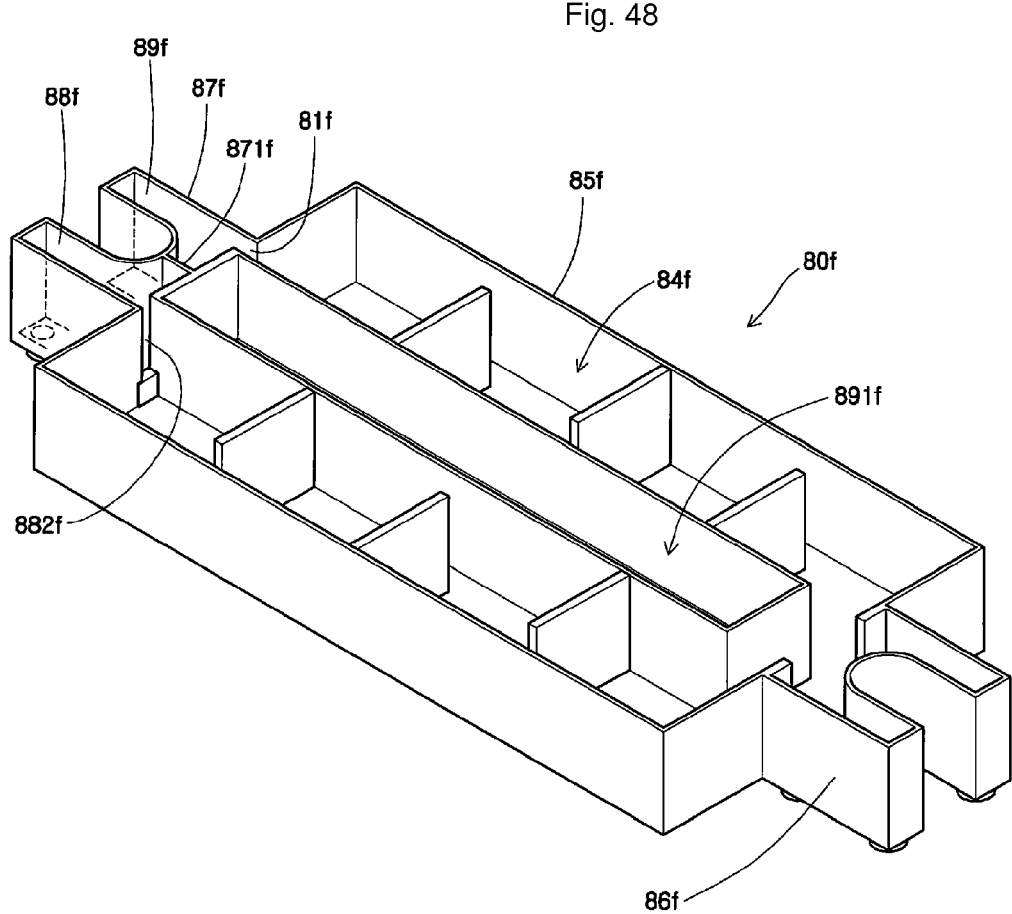
FIG. 48 is a perspective view showing a flowerpot unit employed in the plant cultivation apparatus shown in FIG. 46.
Figure 49:
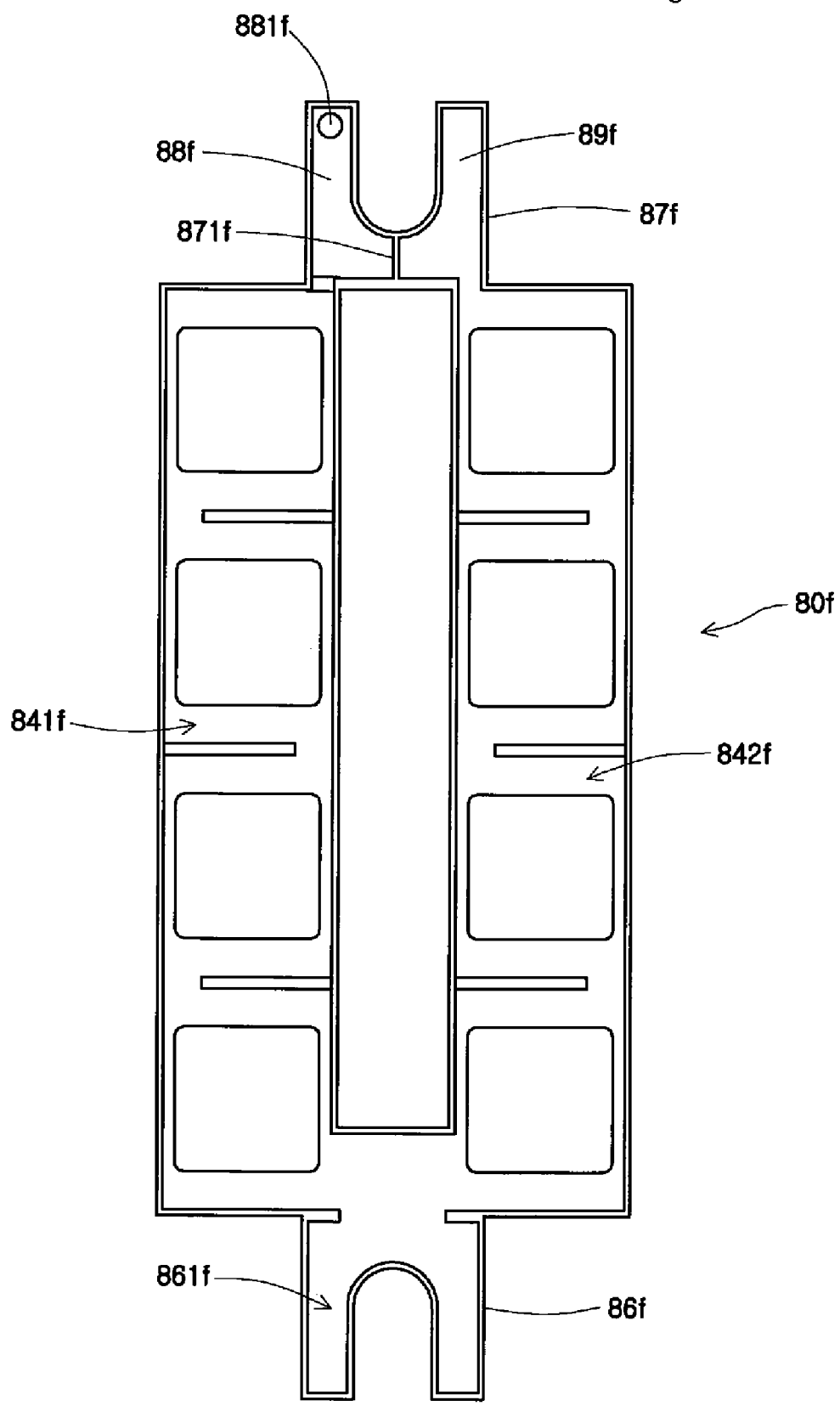
FIG. 49 is a plan view of the flowerpot unit shown in FIG. 48.

Referring to FIGS. 46 through 49, the plant cultivation apparatus includes a flowerpot unit 80f which in turn includes a first coupling portion 87f, a second coupling portion 86f and a cultivating bed portion 85f lying between the first and second coupling portions 87f and 86f. A first space 88f and a second space 89f are formed in the first coupling portion 87f, with a partition wall 871f positioned between the first and second spaces 88f and 89f. A drainage hole 881f is formed in the bottom of the first space 88f. An outlet passage 882f is formed between the first space 88f and a cultivating compartment 84f of the cultivating bed portion 85f and an inlet passage 81f is formed between the second space 89f and the cultivating compartment 84f of the cultivating bed portion 85f. The cultivating bed portion 85f has an isolation space 89f surrounded by the cultivating compartment 84f. The cultivating compartment 84f is formed of a first compartment row 841f and a second compartment row 842f, both of which extend in a parallel relationship with each other. The first and second compartment rows 841f and 842f extend between the first and second coupling portions 87f and 86f. As can be seen in FIG. 45, the first and second compartment rows 841f and 842f is configured in such a fashion as to allow water to flow in zigzag. The first compartment row 841f is joined at one end to the outlet passage 882f near the first coupling portion 87f, while the second compartment row 842f is joined at one end to the inlet passage 81f near the first coupling portion 87f. The first compartment row 841f and the second compartment row 842f are joined at the other ends to an internal space 861f of the second coupling portion 86f. Furthermore, the first compartment row 841f and the second compartment row 842f communicate with each other. The isolation space 891f extends between the first coupling portion 87f and the second coupling portion 86f and lies between the first compartment row 841f and the second compartment row 842f of the cultivating compartment 84f. The outer wall that defines the isolation space 891f is connected at one end to a partition wall 841f of the first coupling portion 87f. Water in the second space 89f of the first coupling portion 87f is introduced into the first space 88f of the first coupling portion 87f via the first compartment row 841f and the second compartment row 842f of the cultivating compartment 84f and then is drained down through the drainage hole 881f formed in the first space 88f. Other configurations are the same as those of the embodiment shown in FIGS. 42 to 45 and therefore no description will be made in that regard.

Figure 50:
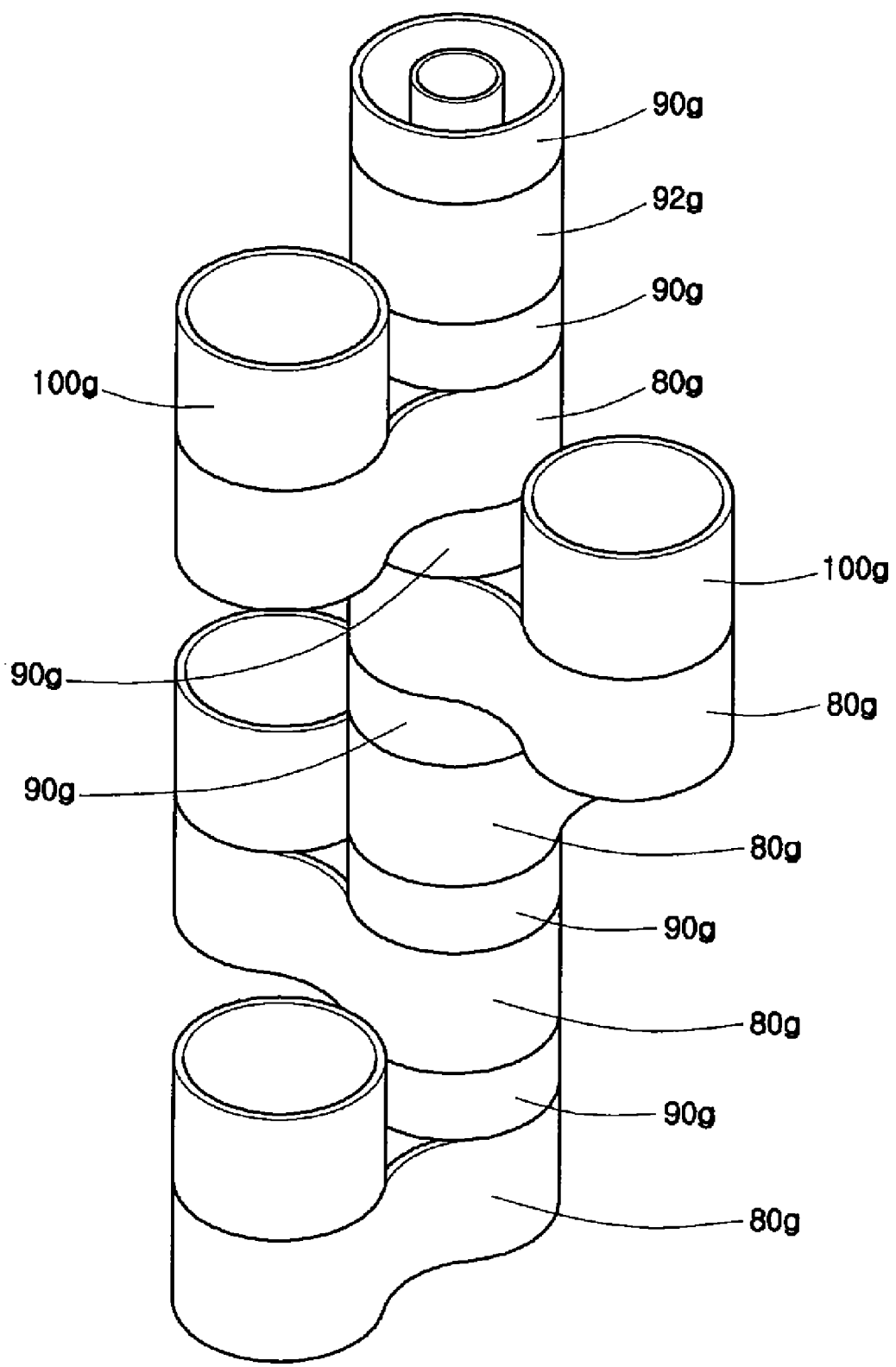
FIG. 50 is a perspective view showing some parts of a plant cultivation apparatus in accordance with a yet still further embodiment of the present invention.
Figure 52:
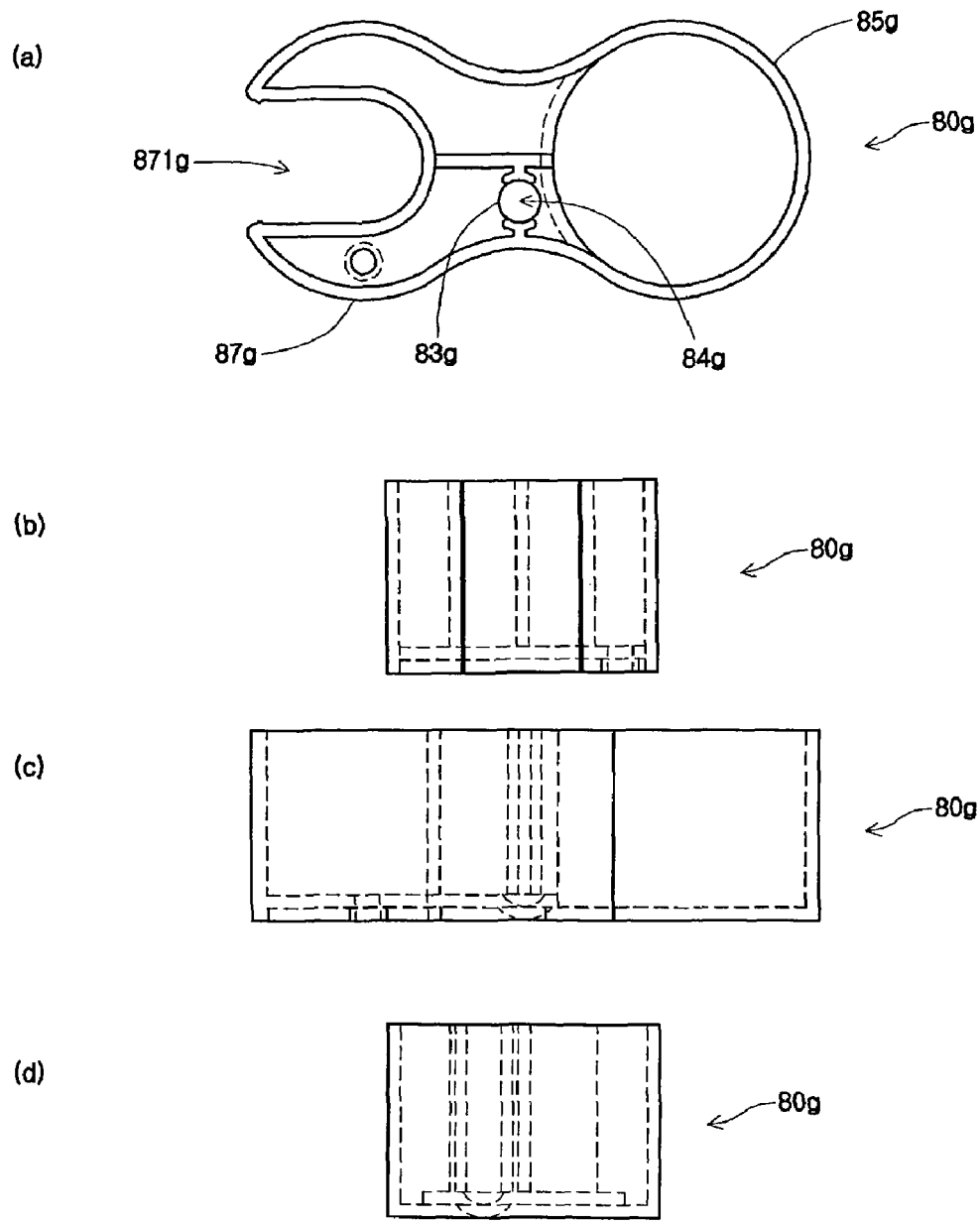
FIGS. 52(a), 52(b), 52(c) and 52(d) are views illustrating a flowerpot unit employed in the plant cultivation apparatus shown in FIG. 50.
Figure 53:
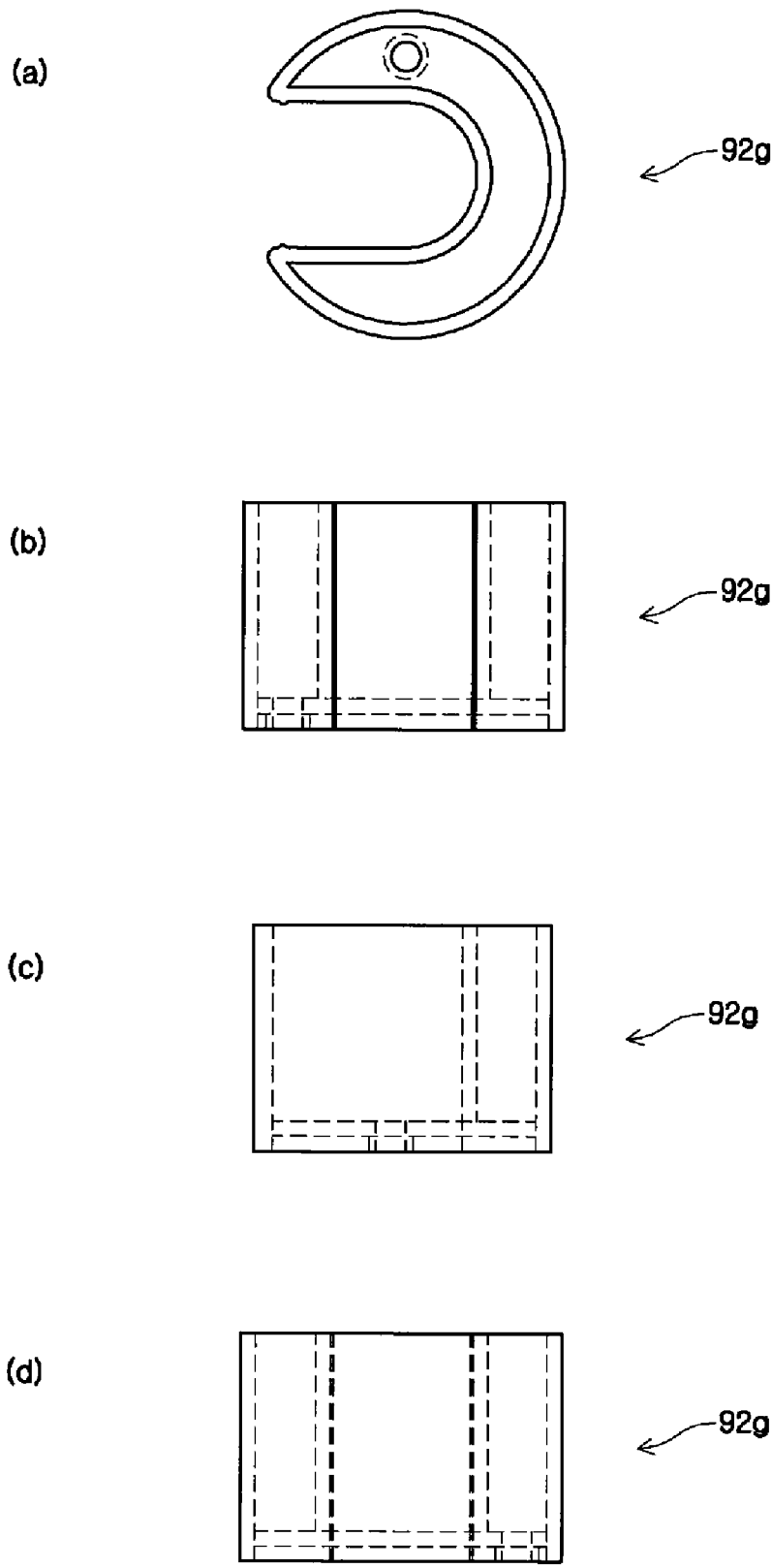
FIGS. 53(a), 53(b), 53(c) and 53(d) are views illustrating a connection unit employed in the plant cultivation apparatus shown in FIG. 50.

Referring to FIG. 50, the plant cultivation apparatus includes a plurality of body units 90g, a plurality of flowerpot units 80g, a connecting unit 92g and a plurality of cultivating kits 100g. As can be seen in FIGS. 50 and 51, each of the body units 90g includes a column portion 91g, a reception portion 94g and a guide portion 96g. The column portion 91g is formed into a hollow cylinder shape so that a central post (not shown) can pass through the internal space of the column portion 91g. The reception portion 94g has a bottom 941g and a side wall 943g and serves to receive water in the space above the column portion 91g. A drainage hole 942g is formed in the bottom 941g. The bottom 941g is inclined so that the water in the reception portion 94g can be drained downwards through the drainage hole 942g. The guide portion 96g is provided with two parallel guide walls 961g and 962g extending in a tangential direction of the column portion 91g. The drainage hole 942g of the reception portion 94g is opened outside the guide walls 961g and 962g. The flowerpot unit 80g or the connecting unit 92g is snugly fitted to the guide portion 96g. Referring to FIGS. 50 and 52, the flowerpot unit 80g includes a cultivating bed portion 85g and a coupling portion 87g. A cultivating kit 100g of the type shown in FIG. 54 is inserted into the cultivating bed portion 85g. The outer wall of the coupling portion 87g has a groove 871g that receives the guide portion 96g of the body unit 90g. A water level control member 83g is removably fitted to the outlet passage 84g so that it can adjust the height of the outlet passage 84g. Other structures of the flowerpot unit 80g are substantially the same as those of the flowerpot unit shown in FIG. 28. As can be seen in FIGS. 50 and 53, the connecting unit 92g has substantially the same configuration as that of the coupling portion 87g of the flowerpot unit 80g.

Figure 56:
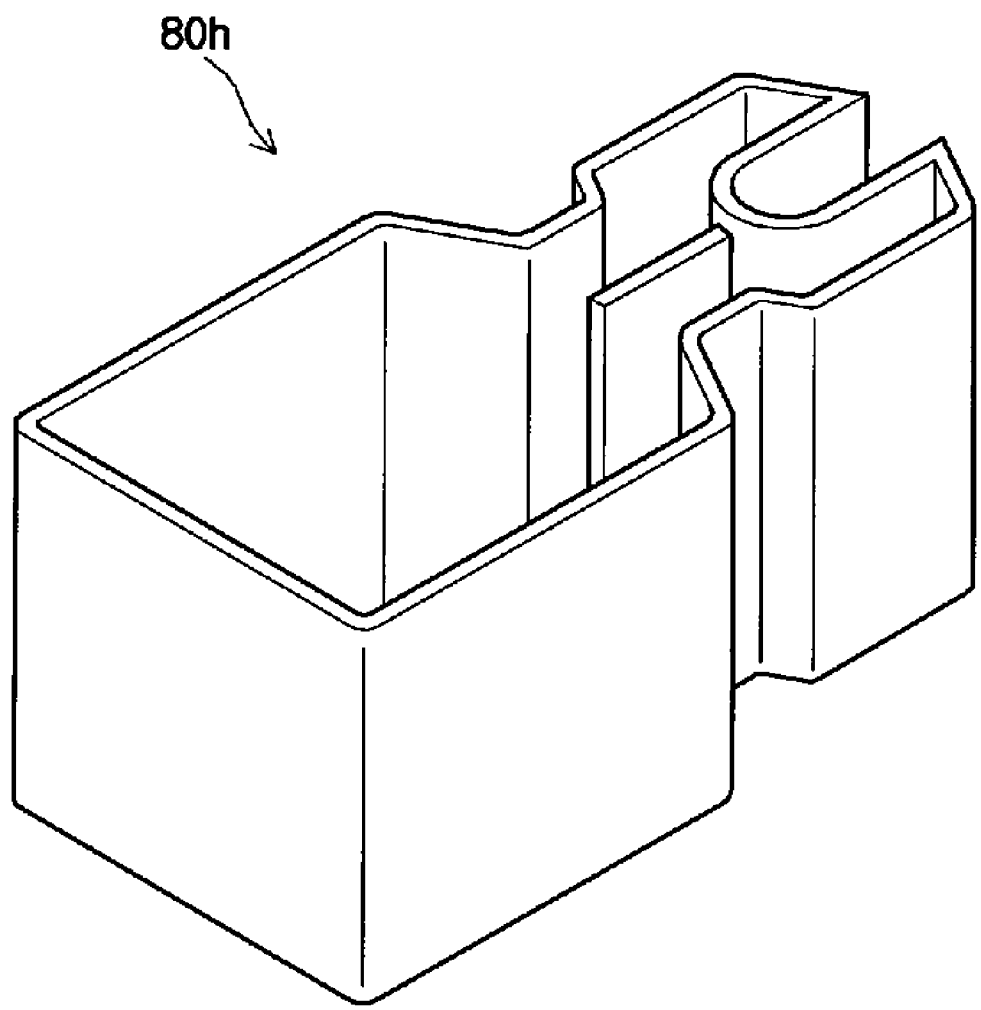
FIG. 56 is a perspective view showing a yet still further example of the flowerpot unit of the plant cultivation apparatus shown in FIG. 50.
Figure 57:
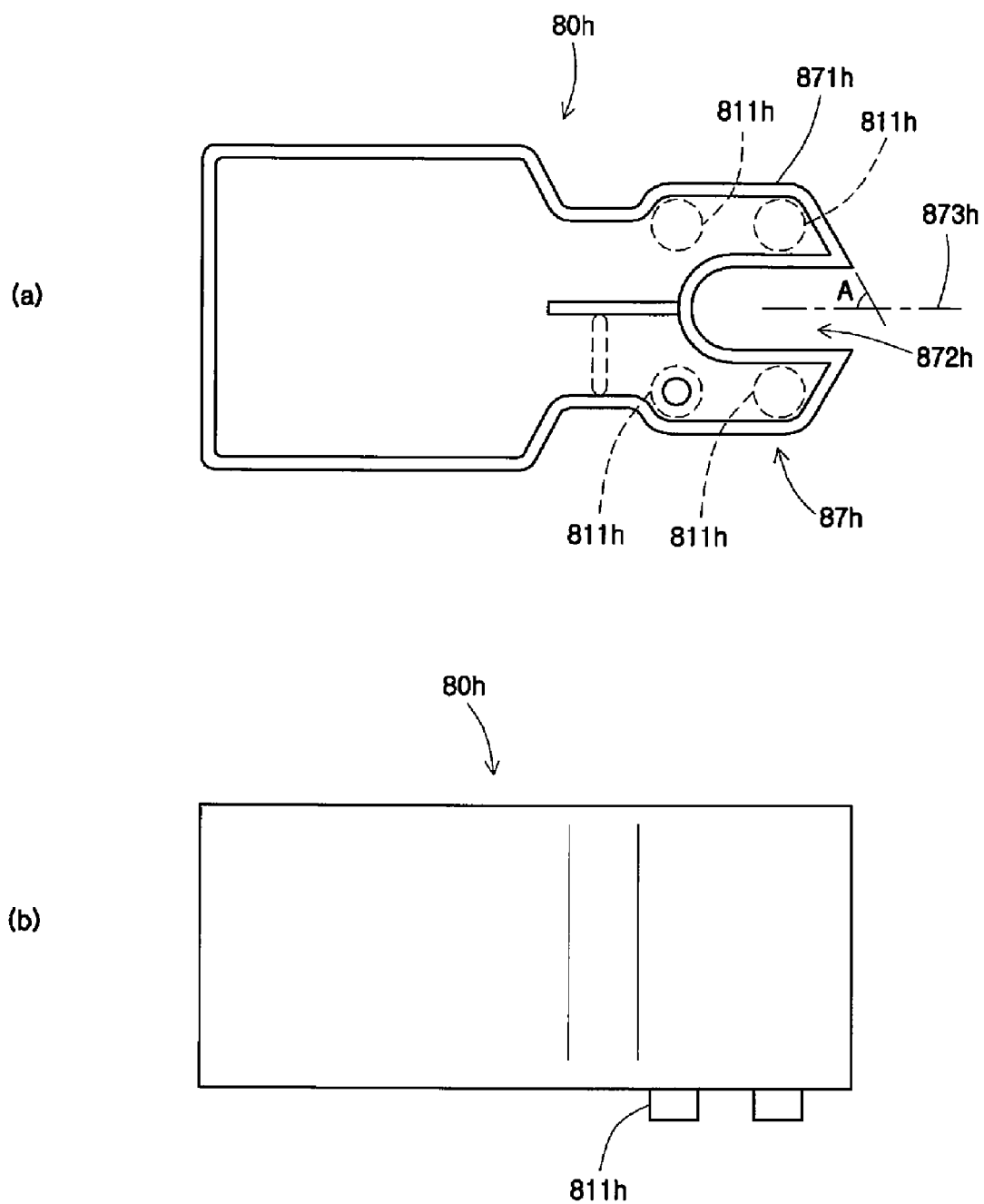
FIG. 57(a) is a plan view of the flowerpot unit shown in FIG. 56
FIG. 57(b) is a side elevational view of the flowerpot unit shown in FIG. 56.
Figure 58:
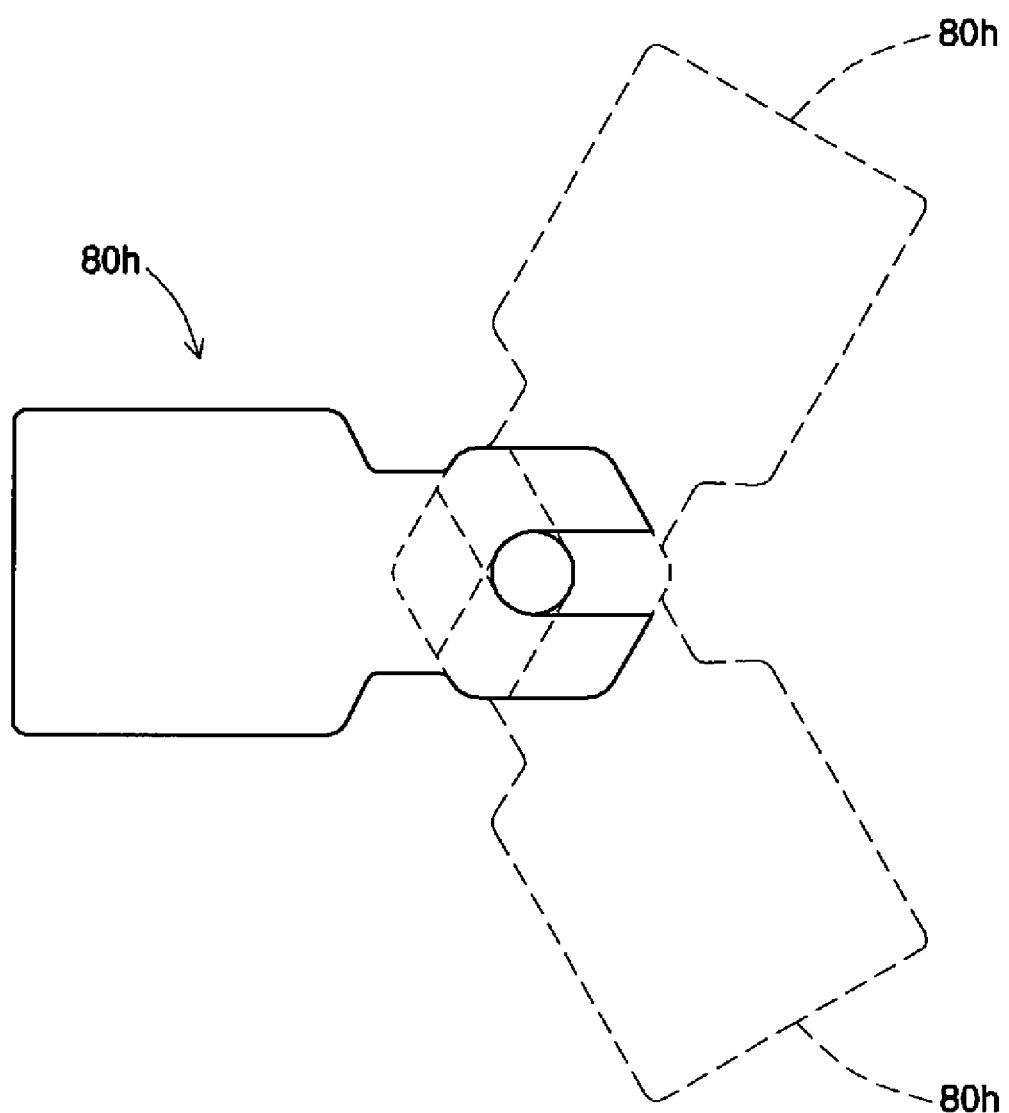
FIG. 58 is a plan view illustrating three flowerpot units placed one above another.

Referring to FIGS. 56 to 58, there is shown a flowerpot unit 80h that constitutes a modification of the flowerpot unit 80 shown in FIG. 28. The flowerpot unit 80h includes cylindrical protrusion portions projecting in a downward direction and a coupling portion 87h having an outer wall 871h. The outer wall 871h has a groove 872h opened at one end and a pair of end wall portions inclined at an angle "A" with respect to a longitudinal center line 873h. Although the angle "A" is 60 degrees in the present embodiment, present invention is not limited thereto. This construction makes it possible to arrange the flowerpot units 80*h* one above another at an angle of 120 degrees as illustrated in FIG. 58.

While the multi-story water storage apparatus is used as a plant cultivation apparatus in the embodiments described above, the present invention is not limited thereto. It will be understood by those skilled in the art that the multi-story water storage apparatus of the present invention may be used in other applications such as a water-filtering apparatus, a decorative product, a fish bowl apparatus and the like.

In the foregoing embodiments, the stackable units, i.e., the flowerpot units and the connector units are made of acrylic resin. However, the present invention is not limited thereto. Alternatively, the stackable units may be made of other materials, e.g., glass or synthetic resins other than acrylic resin.

Although water is automatically supplied by the water pump in the foregoing embodiments, the present invention is not limited thereto. Alternatively, water may be manually supplied to the respective cultivating bed portions by pouring water into the topmost flowerpot unit.

Although glass beads coated with a photocatalytic material are used in the foregoing embodiments, the present invention is not limited thereto. Alternatively, photocatalytic material may be directly coated on the wall surfaces of the stackable units or the stand.

While the present invention has been described with reference to the embodiments noted above, the present invention is not limited thereto. It will be understood by those skilled in the art that various changes and modifications may be made without departing from the scope of the invention defined in the claims.

The invention claimed is:

1. A storage unit, comprising:
a coupling portion having a circular cross-sectional shape;
a storage portion arranged laterally outwardly of the coupling portion, the storage portion having a water storage compartment; and
an outlet passage through which water stored in the storage compartment is drained to a first space of the coupling portion,
wherein the coupling portion includes a bottom having a drainage hole, a side wall extending upwardly from the bottom, a second space isolated from the first space by a partition wall extending upwardly from the bottom and an inlet passage through which the water is introduced from the second space into the storage compartment, and the storage compartment includes at least two individual storage regions arranged circumferentially around the coupling portion, the individual storage regions communicating with one another through a communication passage so that the water can be introduced from one of the individual storage regions into another, and
the coupling portion is further comprising a tubular section having a central passageway, the tubular section formed offset toward the second space from the partition wall, the partition wall is off-centered to make the first space smaller than the second space, extension generally in a horizontal direction to have the first space and the second space arranged one below the other, and the drainage hole formed on the bottom of the coupling portion within the first space in alignment with a center portion of the partition wall.

2. The storage unit as recited in claim 1, the coupling portion is further comprising a tubular section having a central passageway, the passageway of the tubular section has a circular cross-sectional shape.

3. The storage unit as recited in claim 2, wherein protrusion portions are formed on the bottom of the coupling portion.

4. The storage unit as recited in claim 3, wherein the protrusion portions are formed on the bottom of the coupling portion in such a manner as to extend downwardly, wherein the side wall of the coupling portion has a pair of end wall portions inclined at a predetermined angle toward an opened end of the tubular section, the predetermined angle is 60 degrees.

5. The storage unit as recited in claim 1, the coupling portion is further comprising a tubular section having a central passageway, the tubular section opened at one end.

6. The storage unit as recited in claim 1, wherein protrusion portions are formed on the bottom of the coupling portion, at least three protrusion portions having a raised portion extending laterally outwardly are formed on the bottom of the coupling portion, wherein the coupling portion is further provided with a cover covering the first space and the second space.

7. The storage unit as recited in claims 1, wherein the outlet passage is height-adjustable by means of a removable water level control member.

* * * * *